(12) United States Patent
Ochiai

(10) Patent No.: US 12,499,037 B2
(45) Date of Patent: Dec. 16, 2025

(54) MEMORY CONTROLLER AND CONTROL METHOD THEREFOR

(71) Applicant: CANON KABUSHIKI KAISHA, Tokyo (JP)

(72) Inventor: Wataru Ochiai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/585,643

(22) Filed: Feb. 23, 2024

(65) Prior Publication Data

US 2024/0296114 A1 Sep. 5, 2024

(30) Foreign Application Priority Data

Mar. 1, 2023 (JP) .................................. 2023-031315

(51) Int. Cl.
G06F 12/00 (2006.01)
G06F 12/02 (2006.01)

(52) U.S. Cl.
CPC ................................ G06F 12/0223 (2013.01)

(58) Field of Classification Search
CPC ............. G06F 12/0223; G06F 13/1689; G06F 12/0284; G06F 3/0658; G06F 3/0659; G06F 13/1605; G11C 7/1072; G11C 7/22
See application file for complete search history.

(56) References Cited

U.S. PATENT DOCUMENTS

| | | | | |
|---|---|---|---|---|
| 6,247,104 B1 * | 6/2001 | Suzuki | .................. | G06F 13/161 |
| | | | | 711/167 |
| 9,684,461 B1 * | 6/2017 | Dodson | ............... | G06F 13/1668 |
| 2014/0351525 A1 * | 11/2014 | Chen | ..................... | G06F 3/0658 |
| | | | | 711/147 |
| 2015/0074437 A1 * | 3/2015 | Ware | .................... | G11C 7/1078 |
| | | | | 713/400 |
| 2016/0359973 A1 * | 12/2016 | Loh | ........................ | G06F 3/067 |
| 2023/0136432 A1 * | 5/2023 | Kondo | ............. | G11C 11/40615 |
| | | | | 365/163 |

FOREIGN PATENT DOCUMENTS

| | | | | | |
|---|---|---|---|---|---|
| CN | 1815621 A | * | 8/2006 | .......... | G11C 11/413 |
| CN | 106201347 A | * | 12/2016 | .......... | G06F 3/0679 |
| DE | 19842677 A1 | * | 3/1999 | .......... | G06F 13/161 |
| JP | 2009193107 A | | 8/2009 | | |
| WO | WO-2012021380 A2 | * | 2/2012 | ............. | G06F 1/324 |

* cited by examiner

*Primary Examiner* — Shawn X Gu
*Assistant Examiner* — Mohammad S Hasan
(74) *Attorney, Agent, or Firm* — Canon U.S.A., Inc. IP Division

(57) ABSTRACT

A memory controller comprises a holding unit that holds a plurality of memory accesses to a memory that operates with a first clock. The memory controller generates a plurality of command requests for causing the memory to operate based on the plurality of memory accesses; determines, in synchronization with a second clock having a lower frequency than the first clock, whether a plurality of commands corresponding to the plurality of command requests are issuable, based on a constraint on issuance timings that are respectively set for the plurality of commands; selects, in synchronization with the second clock, one command to be issued to the memory from among commands that have been determined by the determining unit to be issuable; and outputs the selected one command to the memory in synchronization with the first clock.

16 Claims, 20 Drawing Sheets

FIG. 3A

| ACT WR TO SAME BANK | 5 CYCLES |
|---|---|
| RD PRE TO SAME BANK | 5 CYCLES |
| PRE ACT TO SAME BANK | 5 CYCLES |
| RD RD | 4 CYCLES |
| RD WR | 9 CYCLES |
| WR WR | 4 CYCLES |

FIG. 3B

| INDEX | 0 | 1 | 2 | 3 |
|---|---|---|---|---|
| RD/WR | WR | RD | WR | — |
| BANK | 1 | 0 | 2 | — |
| PAGE | 0x0 | 0x0 | 0x1 | — |

| BANK | 0 | 1 | 2 | 3 |
|---|---|---|---|---|
| STATE | Open | Closed | Open | Closed |
| PAGE | 0x0 | — | 0x0 | — |

Open Bank1

622

| BANK | 0 | 1 | 2 | 3 |
|---|---|---|---|---|
| STATE | Open | Open | Open | Closed |
| PAGE | 0x0 | 0x0 | 0x0 | — |

Close Bank2

623

| BANK | 0 | 1 | 2 | 3 |
|---|---|---|---|---|
| STATE | Open | Open | Closed | Closed |
| PAGE | 0x0 | 0x0 | — | — |

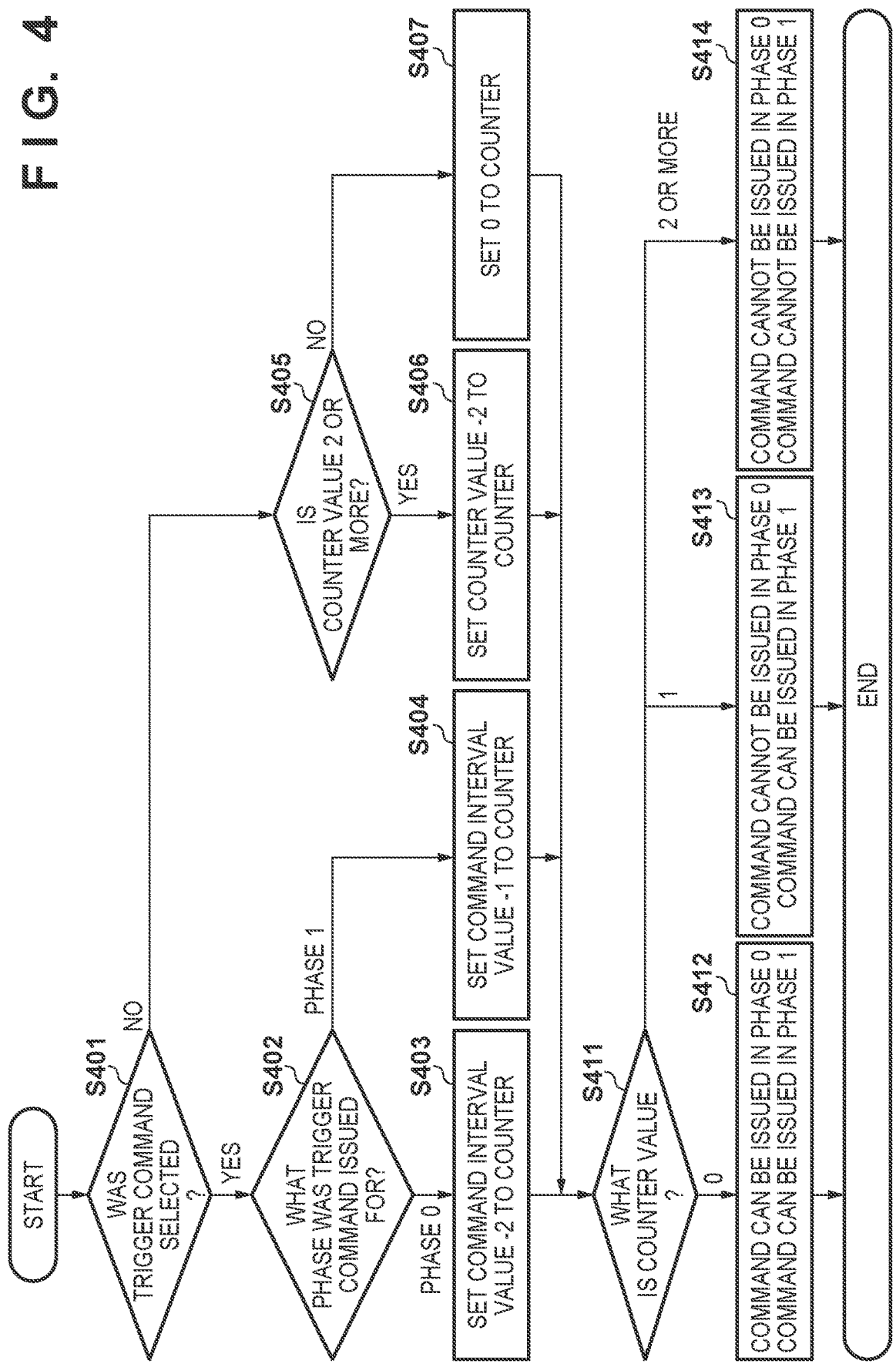

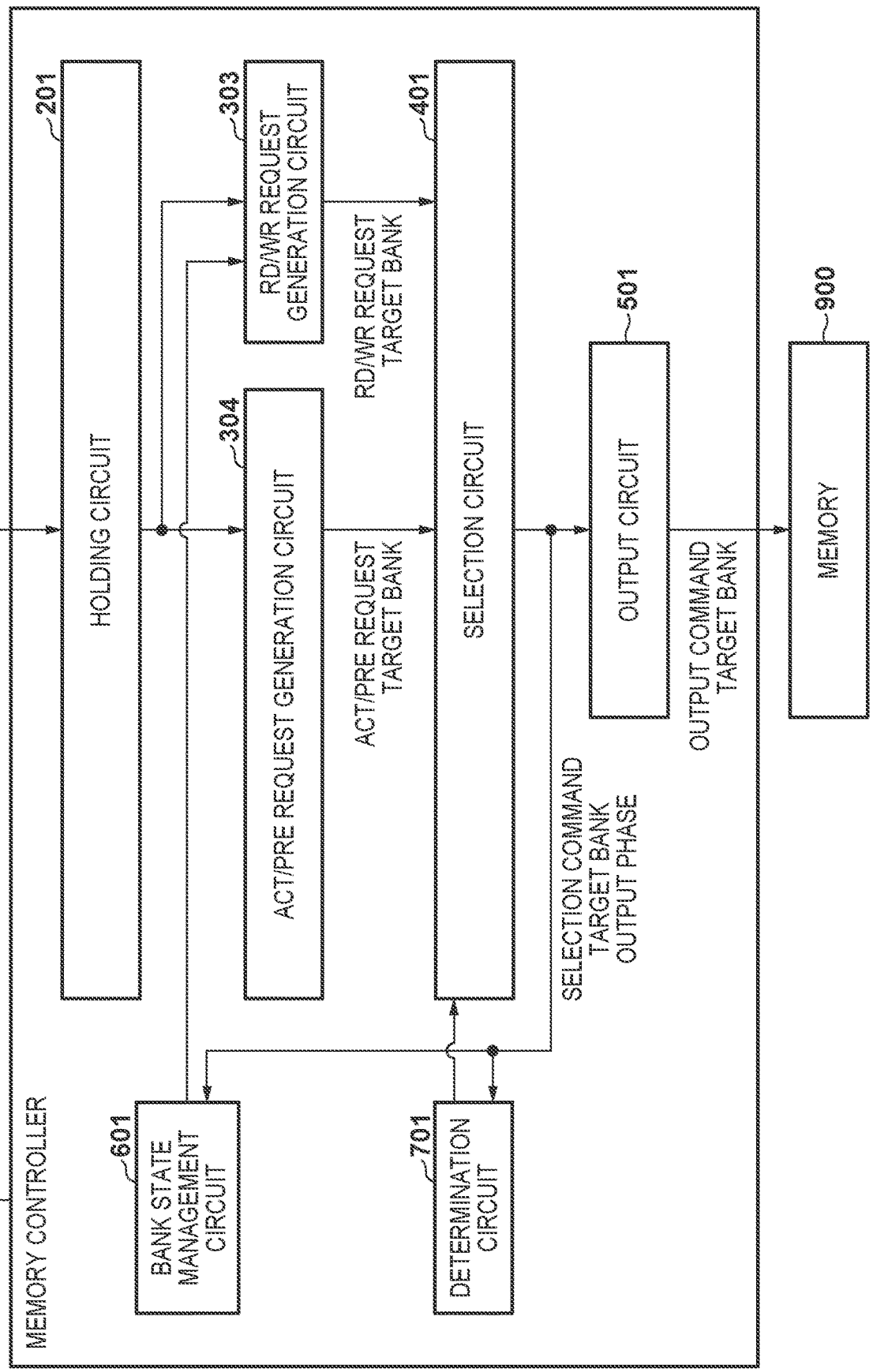

MEMORY CONTROLLER AND CONTROL METHOD THEREFOR

BACKGROUND

Field of the Disclosure

The present disclosure relates to a memory controller and a control method therefor.

Description of the Related Art

Generally, a DRAM is used as a main storage apparatus of a computer system. With increased functionality and increased performance of computer systems, a demand for the performance of a DRAM is increasing, and there has been a demand for maximization of the performance thereof. A DRAM is composed of a plurality of banks; when a page is activated or when a page is precharged, a waiting period occurs, and the access efficiency is reduced. Japanese Patent Laid-Open No. 2009-193107 (hereinafter, Patent Document 1) discloses a scheduling technique intended to improve the performance of a DRAM shared by a plurality of masters in consideration of the foregoing properties.

However, a scheduling circuit disclosed in Patent Document 1 is dependent on the number of masters (the number of initiators) and the number of banks, which causes a decrease in routability and timing convergency of arbiters (inter-master arbitration units) in a preceding stage with an increase in the number of masters. Furthermore, if the number of banks increases, the number of arbiters (inter-master arbitration units) in a preceding stage and the circuit size will increase, thereby reducing routability and timing convergency of arbiters (inter-bank arbitration circuits) in a succeeding stage. This requires a change in design when a memory with a faster operating frequency is used.

SUMMARY

One aspect of the present disclosure provides a memory controller that is robust against at least one of an increase in the number of masters, an increase in the number of banks, and an increase in the operating frequency of a memory.

According to one aspect of the present disclosure, there is provided a memory controller, comprising: a holding unit configured to hold a plurality of memory accesses to a memory that operates with a first clock; a generating unit configured to generate a plurality of command requests for causing the memory to operate based on the plurality of memory accesses; a determining unit configured to determine, in synchronization with a second clock having a lower frequency than the first clock, whether a plurality of commands corresponding to the plurality of command requests are issuable, based on a constraint on issuance timings that are respectively set for the plurality of commands; a selecting unit configured to select, in synchronization with the second clock, one command to be issued to the memory from among commands that have been determined by the determining unit to be issuable; and an output unit configured to output the selected one command to the memory in synchronization with the first clock.

Further features of the present disclosure will become apparent from the following description of embodiments with reference to the attached drawings.

BRIEF DESCRIPTION OF THE DRAWINGS

FIG. 3A is a diagram showing an example of a constraint on timings of commands.

FIG. 3B is a diagram showing examples of holding states of memory accesses in a holding circuit.

FIG. 3C is a diagram showing examples of states in a bank state management circuit.

FIG. 4 is a flowchart for describing the operations of a determination circuit of the first embodiment.

FIG. 19 is a block diagram showing a configuration of a memory controller according to a ninth embodiment.

DESCRIPTION OF THE EMBODIMENTS

Figure 1:
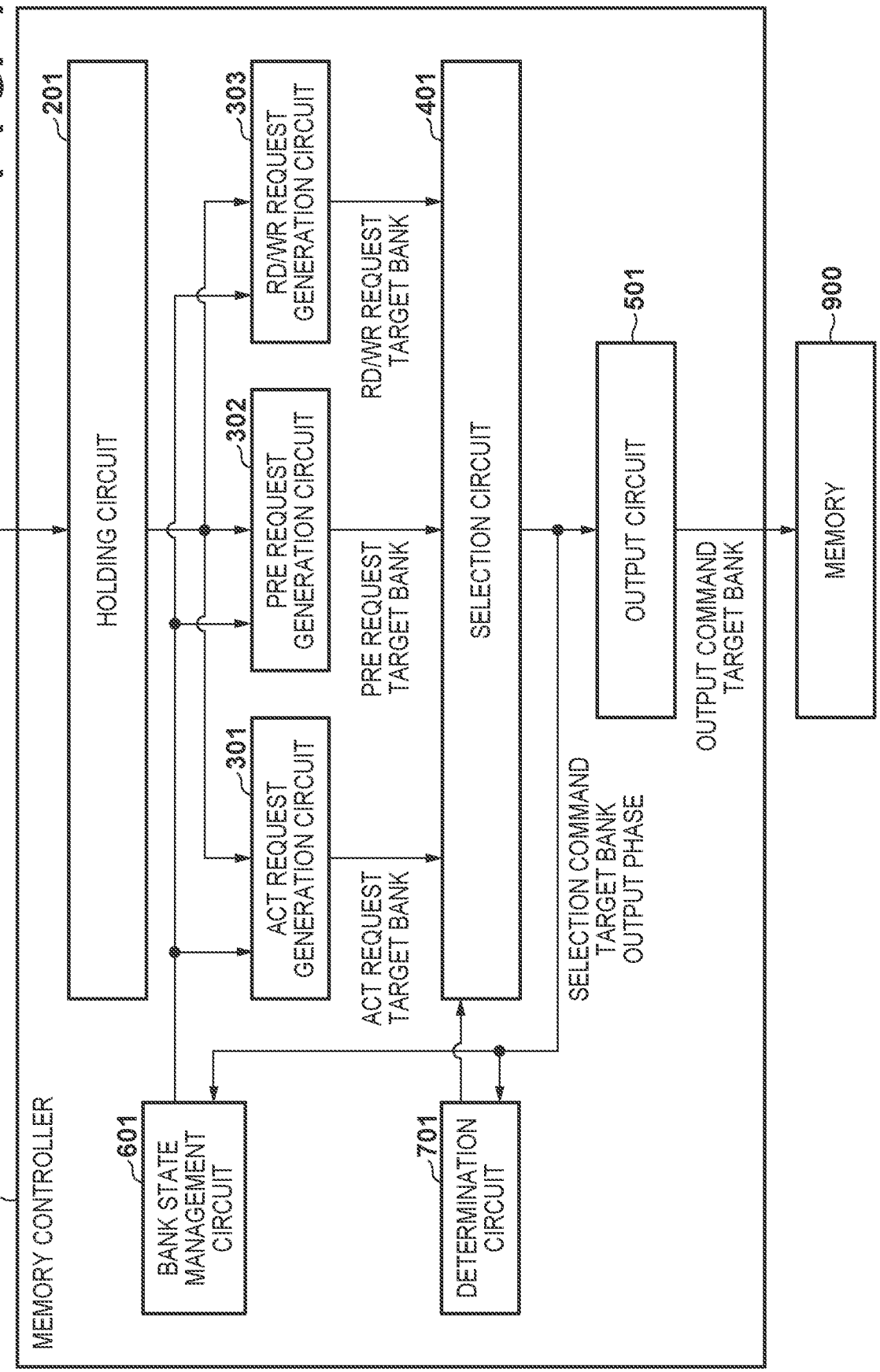
FIG. 1 is a block diagram showing a configuration of a memory controller according to a first embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

The following embodiment will be described in relation to a memory controller that has a function of scheduling commands issued to a memory.

FIG. 1 is a block diagram showing a configuration of a memory controller 101 according to a first embodiment. The memory controller 101 generates a command for accessing a memory 900 composed of a plurality of banks, and issues the command to the memory 900. The memory 900 operates in synchronization with a predetermined clock (hereinafter, a clock 1). A holding circuit 201 (holding unit) holds a plurality of memory accesses to the memory 900, which are issued by a plurality of masters (not shown). A bank state management circuit 601 manages a state of each bank of the memory 900 (e.g., manages whether each bank is in an open state or a closed state).

An ACT request generation circuit 301, a PRE request generation circuit 302, and an RD/WR request generation circuit 303 (generating unit) generate (assert) a plurality of command requests for causing the memory 900 to operate based on the plurality of memory accesses held in the holding circuit 201. The ACT request generation circuit 301 generates an activate command request (hereinafter, an ACT request) based on the memory accesses held in the holding circuit 201 and on the state of each bank indicated by the bank state management circuit 601. The PRE request generation circuit 302 generates a precharge command request (hereinafter, a PRE request) based on the memory accesses held in the holding circuit 201 and on the state of each bank indicated by the bank state management circuit 601. The RD/WR request generation circuit 303 generates a read command request (hereinafter, an RD request) or a write command request (hereinafter, a WR request) based on the memory accesses held in the holding circuit 201 and on the state of each bank indicated by the bank state management circuit 601. Furthermore, each of the ACT request, PRE request, RD request, and WR request includes information indicating a bank to be accessed (a target bank).

Based on a constraint on an issuance timing set for each command, a determination circuit 701 (determining unit) determines whether commands requested by the command requests generated by the ACT request generation circuit 301, PRE request generation circuit 302, and RD/WR request generation circuit 303 can be issued. The determination circuit 701 provides a selection circuit 401 (selecting unit) with a determination result in synchronization with a clock 2, which is slower (lower frequency) than the clock 1 used by the memory 900. Furthermore, the determination circuit 701 generates, for each command, information indicating in which one of a plurality of cycles of a first clock, which exist in one cycle of a second clock, the command can be issued (hereinafter, phase information).

The selection circuit 401 selects, in synchronization with the clock 2, one command to be issued to the memory 900 among the commands that have been determined to be issuable by the determination circuit 701. That is to say, in synchronization with the clock 2, the selection circuit 401 selects a command to be output to the memory 900, from among the commands corresponding to the generated ACT request, PRE request, and RD/WR request, based on the result of determination made by the determination circuit 701 and on the phase information. The selection circuit 401 adds, to the selected command, the phase information indicating in which cycle of the first clock the selected command is issued, and presents the selected command to an output circuit 501 (output unit). In accordance with the command selected by the selection circuit 401 and the phase information added thereto, the output circuit 501 outputs the command to the memory 900 in synchronization with the clock 1.

Figure 2:
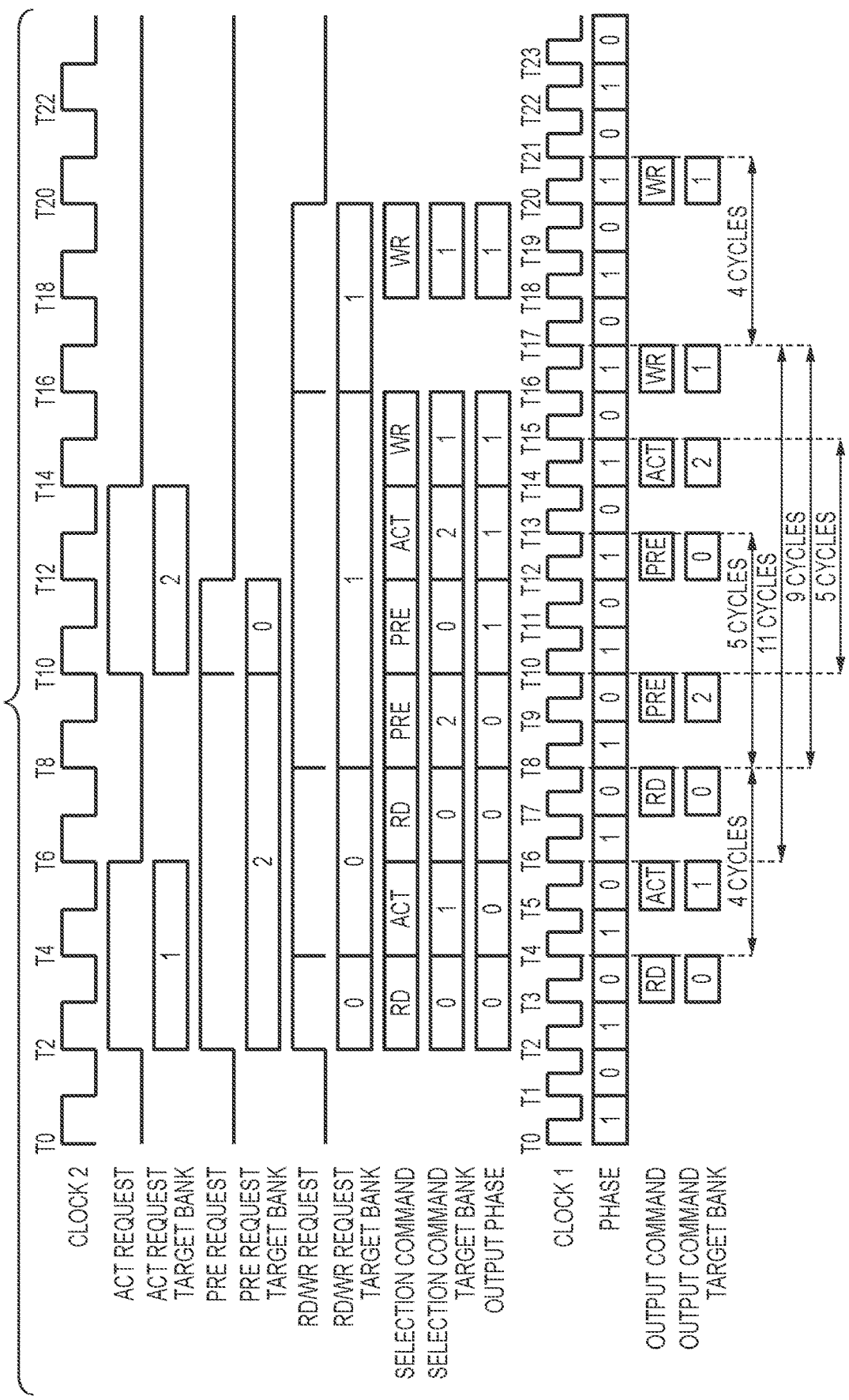
FIG. 2 is a timing diagram showing operations of the memory controller according to the first embodiment.

FIG. 2 is a timing chart showing operations of the memory controller 101 according to the first embodiment configured in the above-described manner. Note that in the present embodiment, it is assumed that the operating frequency of the clock 1 used by the memory 900 is twice the operating frequency of the clock 2 used by the determination circuit 701 and the selection circuit 401. Therefore, two cycles of the clock 1 exist in one cycle of the clock 2. Also, FIG. 3A shows a constraint on issuance timings of commands in the present example. In the present example, the constraint on issuance timings indicates a necessary interval between the issuance of a certain command and the issuance of the next command using the number of cycles, and is hereinafter referred to as a cycle constraint. According to this cycle constraint, two continuous RD commands need to be issued at an interval of at least four cycles. Also, two continuous WR commands also need to be issued at an interval of at least four cycles. An interval of at least nine cycles needs to exist between the issuance of an RD command and the issuance of a WR command. An interval of at least five cycles needs to exist between the issuance of an ACT command and the issuance of a WR command to the same bank. An interval of at least five cycles needs to exist between the issuance of an RD command and the issuance of a PRE command to the same bank. An interval of at least five cycles needs to exist between the issuance of a PRE command and the issuance of an ACT command to the same bank.

FIG. 3B is a diagram for describing how memory accesses are held in the holding circuit 201. As shown in FIG. 3B, the holding circuit 201 can hold, for example, four memory accesses. FIG. 3B exemplarily shows a state where three memory accesses are held. A memory access of index 0 is WR, which is a memory access to bank 1, page 0x0. A memory access of index 1 is RD, which is a memory access to bank 0, page 0x0. A memory access of index 2 is WR, which is a memory access to bank 2, page 0x1. It is assumed that one memory access (RD or WR) executes RD or WR twice with respect to the memory 900.

Furthermore, the following description will be provided under the assumption that the bank state management circuit 601 starts operations from a state 621 of FIG. 3C. In the state 621, bank 0 is in a state where page 0x0 is open. Bank 1 is in a state where none of the pages is open. Bank 2 is in a state where page 0x0 is open. Bank 3 is in a state where none of the pages is open. When page 0x0 of bank 1 is opened in this state, the state 621 transitions to a state 622, which further transitions to a state 623 when bank 2 is closed.

Through processing shown in a flowchart of FIG. 4, the determination circuit 701 determines whether each of the commands requested by the ACT request generation circuit 301, PRE request generation circuit 302, and RD/WR request generation circuit 303 can be issued, and in which phase it can be issued. The following describes operations of the flowchart of FIG. 4, using an example of the issuance of an ACT command through to the issuance of a WR command. In a case where a WR command is issued subsequent to an ACT command, these commands need to be issued at an interval of at least five cycles according to the cycle constraint shown in FIG. 3A. Note that the processing shown in FIG. 4 is executed by the determination circuit 701 in synchronization with the clock 2 (e.g., executed at timings of T0, T2, T4, . . . of FIG. 2). The determination circuit 701 determines whether a command can be issued and a phase so as to minimize the output interval between commands while satisfying the constraint on issuance timings.

The determination circuit 701 determines whether a trigger command (an ACT command in the present example) has been selected (step S401). In a case where it has been determined that an ACT command has been issued (YES in step S401), the determination circuit 701 determines which phase has been designated with respect to this trigger command (step S402). In the present example, as the operating frequency of the clock 1 is twice the operating frequency of the clock 2, two cycles of the clock 1 exist in one cycle of the clock 2, and they are referred to as phases 0 and 1. In a case where the determination circuit 701 has determined that an ACT command and phase 0 have been selected, the determination circuit 701 sets a value obtained by subtracting 2 from the command interval designated by the cycle constraint in a counter. In the present example, as the command interval designated by the cycle constraint is five cycles, 5−2=3 is set in the counter. By setting "command interval−2" in the counter in a case where an ACT command and phase 0 have been selected, the next command (WR command) can be issued the earliest under the constraint on the command intervals. On the other hand, in a case where the determination circuit 701 has determined that an ACT command and phase 1 have been selected, the determination circuit 701 sets a value obtained by subtracting one from the command interval designated by the cycle constraint in the counter (step S404). In the present example, as the command interval is five cycles, 5−1=4 is set as a counter value. By setting "command interval−1" in the counter in a case where the trigger command has been issued in phase 1, the next WR command can be issued the earliest under the constraint on the command intervals.

In a case where a trigger command has not been selected (NO in step S401), processing proceeds to step S405. The determination circuit 701 determines whether the counter value is equal to or larger than 2 (step S405). If the counter value is equal to or larger than 2 (YES in step S405), the determination circuit 701 sets the counter value−2 in the counter (step S406); if the counter value is smaller than 2 (NO in step S405), the determination circuit 701 sets 0 in the counter (step S407).

Subsequently, the determination circuit 701 checks the counter value and causes processing to branch in accordance with the counter value (step S411). If the counter value is 0, the determination circuit 701 determines that a command following the trigger command can be issued in phase 0 and phase 1 (step S412). If the counter value is 1, the determination circuit 701 determines that this command cannot be issued in phase 0, and can be issued in phase 1 (step S413). If the counter value is equal to or larger than 2, the determination circuit 701 determines that this command can be issued in neither phase 0 nor phase 1 (step S414).

Figure 5:
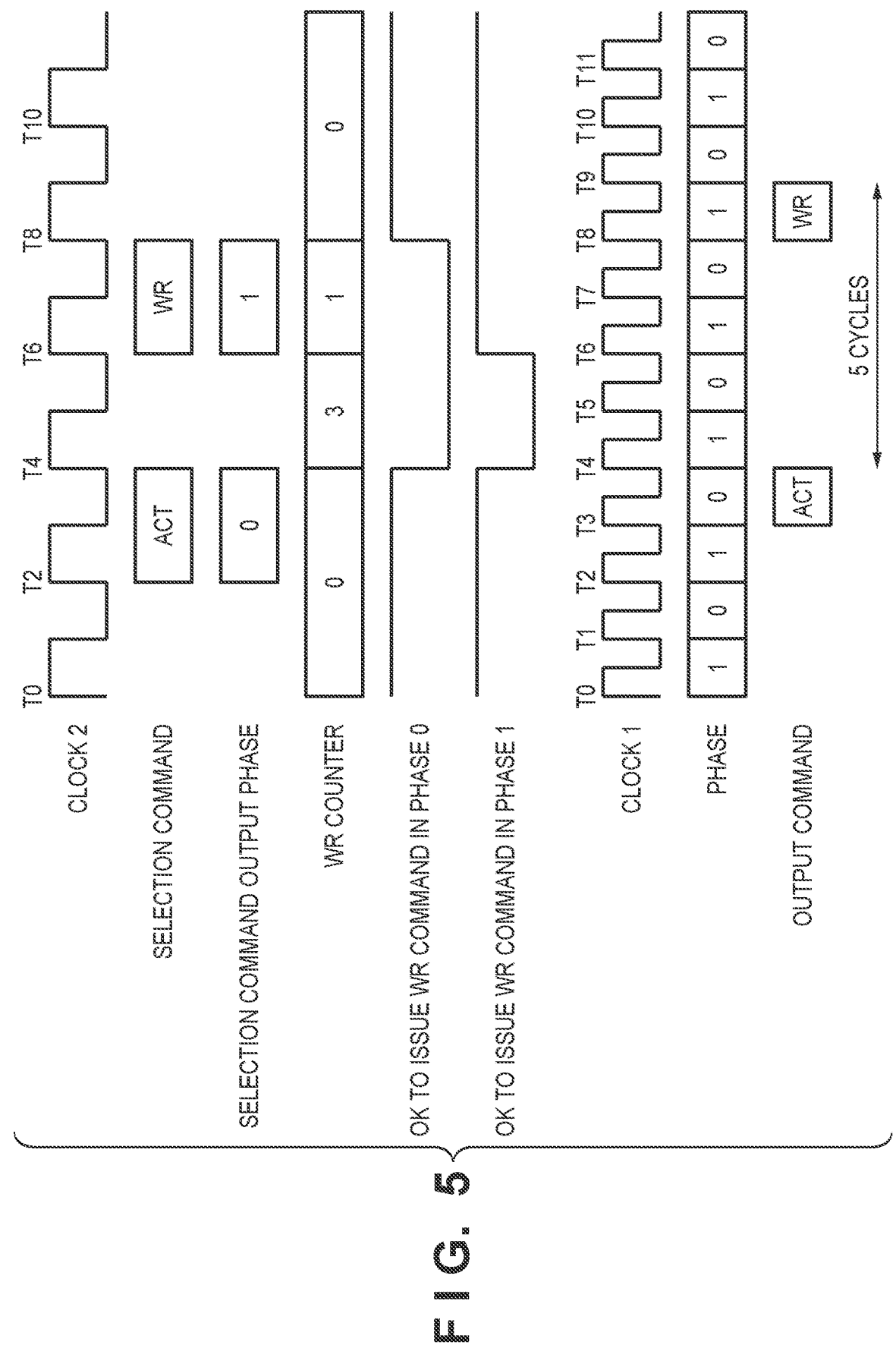
FIG. 5 is a timing diagram showing operations of the determination circuit of the first embodiment.

FIG. 5 is a timing diagram showing an output timing of the result of determination made by the determination circuit 701 about whether a WR command can be issued (the issuable state of the WR command in phase 0, and the issuable state of the WR command in phase 1) in a case where ACT command/phase 0 has been selected. It is assumed that, at T2, the selection circuit 401 selected an ACT command to be issued in phase 0. Hereinafter, this is denoted by ACT command/phase 0. At T4, the determination circuit 701 detects the selection of ACT command/phase 0, and sets 3 as the counter value (YES in step S401, "phase 0" in step S402, and step S403). In the case of the present example, the cycle constraint between the ACT command and the WR command is 5 cycles, and thus "3", which is a value obtained by subtracting 2 from 5, is set in the counter. As the counter value is 3 at this point, the issuance of the WR command is permitted in neither phase 0 nor phase 1 of this cycle (steps S411 and S414). Thereafter, at T6, the counter value becomes 1 (step S406), and thus the determination circuit 701 produces an output indicating that the WR command cannot be issued in phase 0 and can be issued in phase 1 (step S413). In response to this determination result, the selection circuit 401 selects WR command/phase 1 at T6. In response to this selection, the output circuit 501 outputs the WR command to the memory 900 at the timing of T8 with the clock 1. In this way, the ACT command is output at T3 of the clock 1 (phase 0), and the WR command is output at T8 (phase 1), as shown in FIG. 5. Therefore, the interval between these commands is five cycles, which satisfies the cycle constraint.

Figure 6:
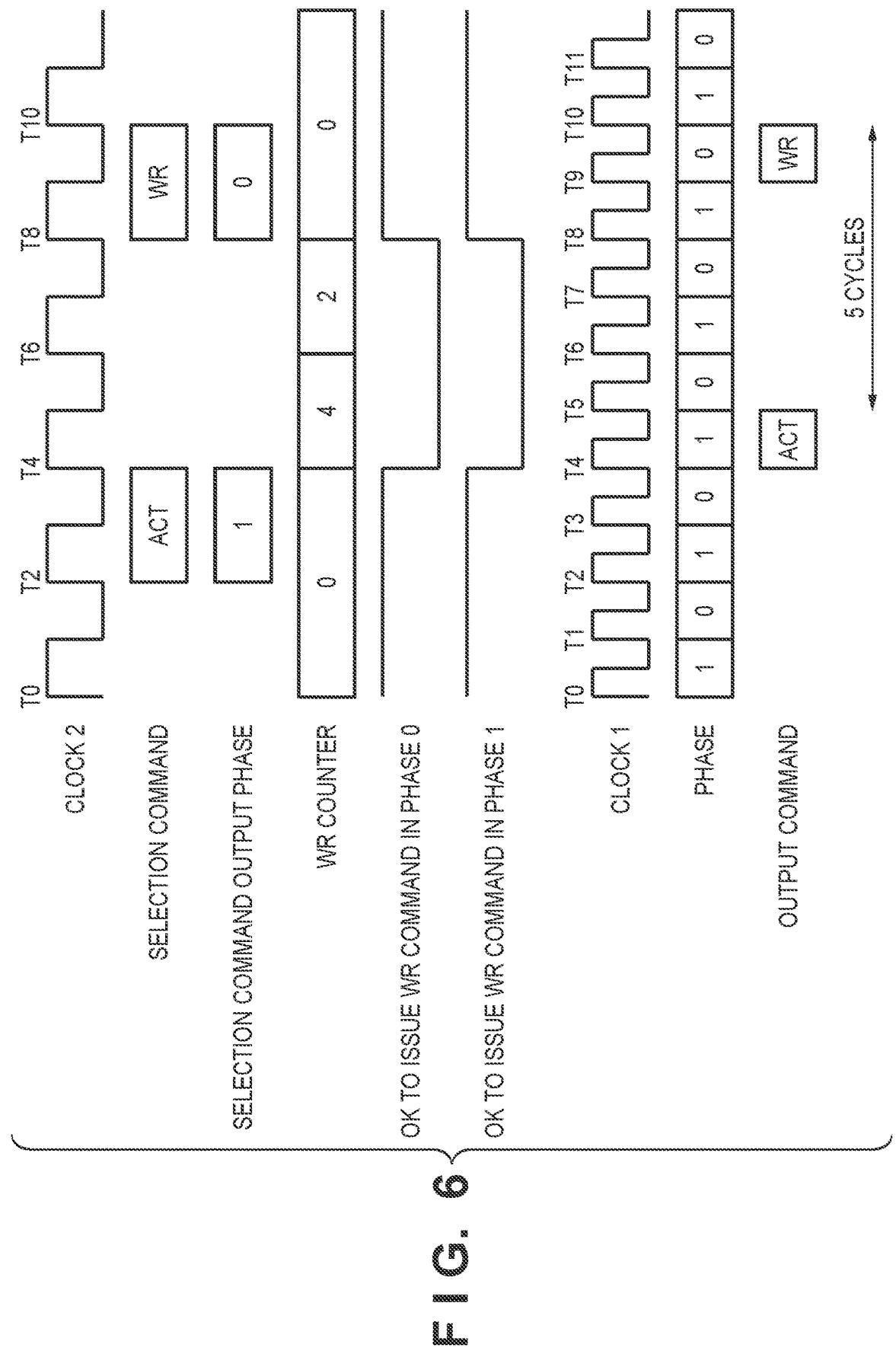
FIG. 6 is a timing diagram showing operations of the determination circuit of the first embodiment.

FIG. 6 is a timing diagram showing an output timing of the result of determination about whether a WR command can be issued in each phase in a case where ACT command/phase 1 has been selected as a trigger command. It is assumed that the selection circuit 401 selected ACT command/phase 1 at T2. At T4, the determination circuit 701 detects the selection of ACT command/phase 1, and sets 4 as the counter value (YES in step S401, "phase 1" in step S402, and step S404). In the case of the present example, "4", which is a value obtained by subtracting 1 from the cycle constraint between the ACT command and the WR command, namely 5 cycles, is set as the counter value. As the counter value is 4 at this point, the issuance of the WR command is permitted in neither phase 0 nor phase 1. At T6 as well, as the counter value in the determination circuit 701 is 2, the issuance of the WR command is permitted in neither phase 0 nor phase 1. Thereafter, the counter value in the determination circuit 701 becomes 0 at T8 (step S406), and thus the determination circuit 701 determines that the WR command can be issued in phase 0 and phase 1 (step S412). In response to this determination result, the selection circuit 401 selects WR command/phase 0 at T8. In response to this selection, the output circuit 501 outputs the WR command to the memory 900 at T9 of the clock 1 (phase 0). Through the foregoing operations, the ACT command is output at T4 (phase 1), and the WR command is output at T9 (phase 0), as shown in FIG. 6. Therefore, the output interval between these commands is 5 cycles, and the cycle constraint is satisfied.

Note that in accordance with the order of priority that has been preset for preset command types, the selection circuit 401 selects a command from among the commands that can be issued in one of phase 0 and phase 1. For example, the selection circuit 401 selects a command in the following order or priority: an RD/WR command, an ACT command, and a PRE command. Note that in a case where an issuable RD command and an issuable WR command exist, either the RD command or the WR command may be prioritized. Also, in a case where it has been determined that the issuance in phase 0 and phase 1 is possible with respect to the same command, the selection circuit 401 selects a phase that is first in order (phase 0).

Returning to FIG. 2, the operations of the memory controller 101 of the present embodiment will be described. At T2, the ACT request generation circuit 301 asserts an ACT request with a target bank 1 with respect to the memory access of index 0 (FIG. 3B) in order to open bank 1. Also, the PRE request generation circuit 302 asserts a PRE request with a target bank 2 in order to close bank 2 prior to the memory access of index 2 (FIG. 3B). Furthermore, the RD/WR request generation circuit 303 asserts an RD request with a target bank 0 (it is assumed that bank 0 is in an open state) for the first RD with respect to the memory access of index 1. Note, it is assumed that the issuance of these three commands is permitted in both phase 0 and phase 1 at the time of T2. Therefore, in accordance with the aforementioned order of priority, the selection circuit 401 selects RD command/phase 0 from among the ACT command, PRE command, and RD command. At T3, the output circuit 501 outputs the RD command selected by the selection circuit 401 to the memory 900.

At T4, the ACT request generation circuit 301 keeps asserting the ACT request for opening bank 1 with respect to the memory access of index 0. The PRE request generation circuit 302 keeps asserting the PRE request for closing bank 2 with respect to the memory access of index 2. The RD/WR request generation circuit 303 asserts an RD request for the second RD with respect to the memory access of index 1. As the RD command was selected in phase 0 at T2, the determination circuit 701 determines that the RD command cannot be issued at the time of T4. As a result, the selection circuit 401 cannot select the RD command at T4, and selects ACT command/phase 0 in accordance with the aforementioned order of priority. Consequently, the output circuit 501 outputs the ACT command to the memory 900 at T5.

At T6, the ACT request generation circuit 301 deasserts the ACT request as the holding circuit 201 does not hold a memory access for which the ACT command needs to be issued. The PRE request generation circuit 302 keeps asserting the PRE request for closing bank 2 with respect to the memory access of index 2. The RD/WR request generation circuit 303 keeps asserting the RD request for the second RD with respect to the memory access of index 1. At T6, the determination circuit 701 determines that the second RD command can be issued in both phase 0 and phase 1. Therefore, the selection circuit 401 prioritizes the RD command over the PRE command in accordance with the preset order of priority, thereby selecting RD command/phase 0. Consequently, the output circuit 501 outputs the RD command to the memory 900 at T7.

At T8, the PRE request generation circuit 302 keeps asserting the PRE request for closing bank 2 with respect to the memory access of index 2. The RD/WR request generation circuit 303 asserts a WR request for the first WR with respect to the memory access of index 0. As RD command/phase 0 was selected at T6, the determination circuit 701 does not permit the issuance of a WR command at the time of T8. Therefore, only the PRE command is the command that can be issued at the time of T8, and the selection circuit 401 selects PRE command/phase 0. Consequently, the output circuit 501 outputs the PRE command to the memory 900 at T9.

At T10, the ACT request generation circuit 301 asserts an ACT request in order to open bank 2 with respect to the memory access of index 2. As the access to page 0x0 of bank 0 no longer exists, the PRE request generation circuit 302 asserts a PRE request with respect to bank 0. The RD/WR request generation circuit 303 keeps asserting the WR request for the first WR with respect to the memory access of index 0. As the issuance of the RD command in phase 0 was selected at T6, the determination circuit 701 does not permit the issuance of the WR command in either phase 0 or phase 1. Also, as PRE command/phase 0 targeting bank 2 was selected at T8, the determination circuit 701 does not permit the issuance of the ACT command targeting bank 2 in either phase 0 or phase 1. Furthermore, as RD command/phase 0 targeting bank 0 was selected at T6, the determination circuit 701 determines that the PRE command targeting bank 0 can be issued in phase 1. As a result, only the issuance of the PRE command targeting bank 0 in phase 1 is the issuance permitted at T10, and the selection circuit 401 selects this PRE command/phase 1. Consequently, the output circuit 501 outputs the PRE command targeting bank 0 to the memory 900 at T12.

At T12, the ACT request generation circuit 301 keeps asserting the ACT request for opening bank 2 with respect to the memory access of index 2. The RD/WR request generation circuit 303 keeps asserting the WR request for the first WR with respect to the memory access of index 0. As RD command/phase 0 was selected at T6, the determination circuit 701 does not permit the issuance of a WR command at the time of T12. On the other hand, as PRE command/phase 0 targeting bank 2 was selected at T8, the determination circuit 701 permits the issuance of the ACT command targeting bank 2 in phase 1. The selection circuit 401 selects ACT command/phase 1 targeting bank 2, which has been permitted to be issued. Consequently, the output circuit 501 outputs the ACT command to the memory 900 at T14.

At T14, the RD/WR request generation circuit 303 keeps asserting the WR request for the first WR with respect to the memory access of index 0. As RD command/phase 0 was selected at T6, the determination circuit 701 determines that the WR command can be issued in phase 1. The selection circuit 401 selects WR command/phase 1, which has been determined to be issuable. Consequently, the output circuit 501 outputs the WR command to the memory 900 at T16.

At T16, the RD/WR request generation circuit 303 asserts a WR request for the second WR with respect to the memory access of index 0. As WR command/phase 1 was selected at T14, the determination circuit 701 does not permit the issuance of this WR command. As a result, there is no command that has been permitted to be issued, and the selection circuit 401 does not select any command. At T18, the RD/WR request generation circuit 303 keeps asserting the WR request for the second WR with respect to the memory access of index 0. As the selection circuit 401 selected WR command/phase 1 at T14, the determination circuit 701 determines that the WR command can be issued in phase 1. In response to this determination, the selection circuit 401 selects WR command/phase 1. The output circuit 501 outputs the WR command to the memory 900 at T20.

The first embodiment has been described above under the assumption that the selection circuit 401 issues a command in a phase in which the command can be issued to the memory 900 the earliest out of the information which is generated by the determination circuit 701 and which indicates whether commands can be issued in each phase. However, the selection circuit 401 may issue the command in another phase as long as it is a phase in which the command can be issued out of the information which is generated by the determination circuit 701 and which indicates whether commands can be issued in each phase. Furthermore, the selection circuit 401 may also output phases in which the issuance of commands is prohibited.

As described above, according to the first embodiment, the phases of a clock for outputting commands is controlled by selecting, in synchronization with a clock slower (having a lower frequency) than a memory clock, a command to be output from among the command requests generated in accordance with the memory accesses held in the holding circuit 201. In this way, timing convergency can be improved while appropriately controlling the command interval in accordance with the cycle constraint.

Note, it is assumed in the embodiment that the selection circuit 401 selects a command in the following order of priority: an RD/WR command, an ACT command, and a PRE command; however, the present disclosure is not limited to this.

Second Embodiment

In the first embodiment, phases are determined so that commands can be issued at the shortest command interval while satisfying the cycle constraint. A second embodiment will be described in relation to a configuration in which commands are issued to the memory 900 in a predetermined fixed cycle, which is one of the cycles (phases) of the clock 1 that exist within one cycle of the clock 2.

Figure 7:
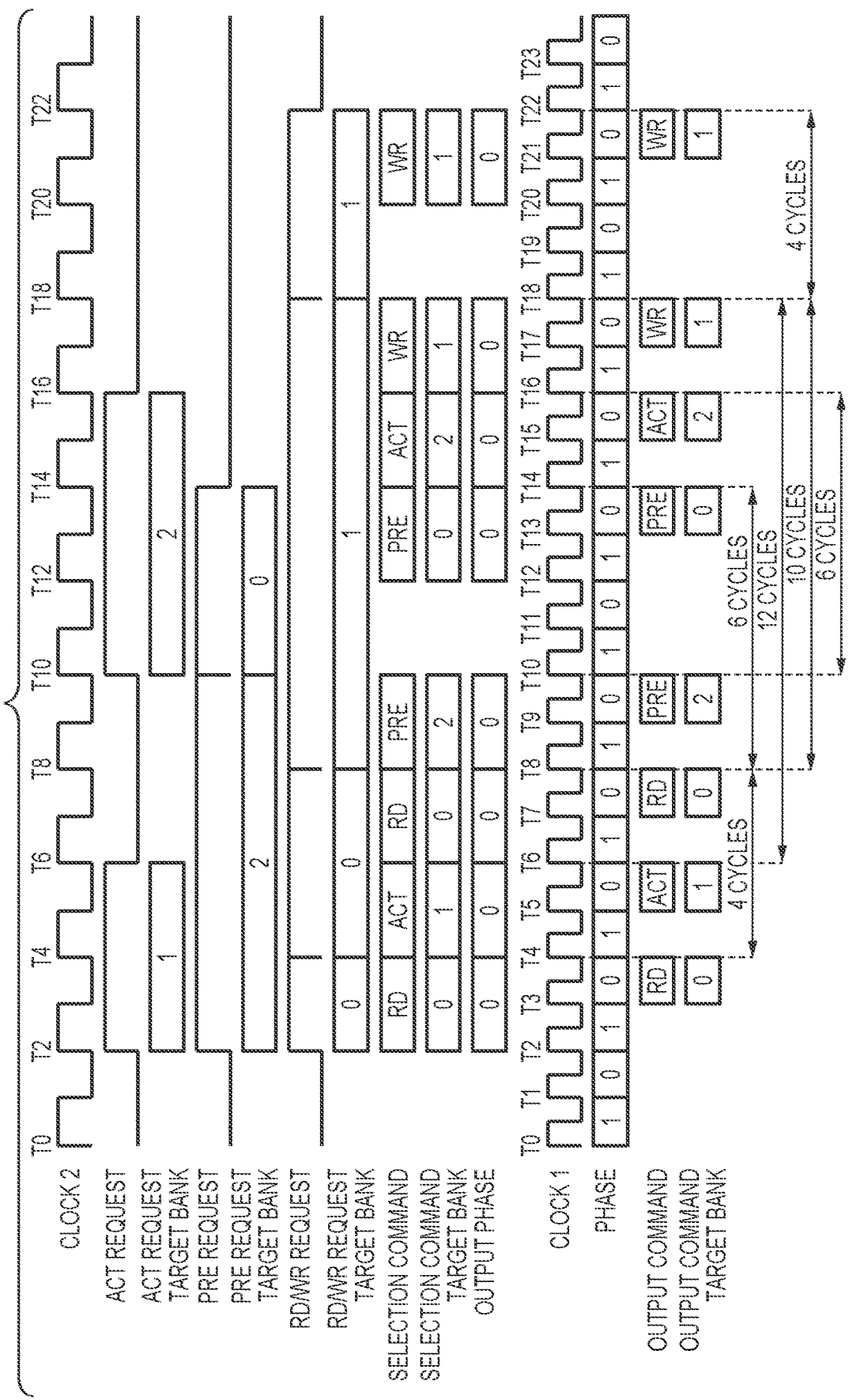
FIG. 7 is a timing diagram showing operations of the memory controller according to a second embodiment.

FIG. 7 is a timing diagram showing operations of the memory controller 101 according to the second embodiment. The difference from the first embodiment is that the selection circuit 401 selects only a command that has been allowed to be issued in phase 0. This control can be performed, for example, by the selection circuit 401 selecting one command from among the commands that have been permitted by the determination circuit 701 to be issued in phase 0 in accordance with the order of priority. Alternatively, the determination circuit 701 may determine that only commands that have been allowed to be issued in phase 0 are issuable. In this case, for example, it is sufficient to determine that a command is issuable only in a case where the counter value is 0 in step S411, and prohibit the issuance in other cases in the flowchart of FIG. 4. Note that although the second embodiment has been described in relation to the configuration in which commands are issued only in phase 0, no limitation is intended by this, and it is sufficient to place a restriction on phases. For example, a command may be selected so that the command is issued only in phase 1.

By selecting a command only in a fixed phase, implementation of the determination circuit 701, selection circuit 401, and output circuit 501 can be further simplified, and timing convergency can be improved.

Third Embodiment

The first embodiment and the second embodiment have been described in relation to a case where the operating frequency of the clock 1 is twice the operating frequency of the clock 2, and two cycles (two phases) of the clock 1 exist within one cycle of the clock 2. However, the present disclosure is not limited to this, and it is sufficient that the operating frequency of the clock 1 be N times the operating frequency of the clock 2 (where N is a natural number). In this case, the phase information indicates cycles in which a command output is permitted or cycles in which a command output is prohibited among the $0^{th}$ to the $(N-1)^{th}$ cycles of the clock 1 that exist within one cycle of the clock 2. A third embodiment will be described in relation to a case where the operating frequency of the clock 1 is four times larger than the operating frequency of the clock 2 (N=4), and four cycles (four phases) of the clock 1 exist within one cycle of the clock 2.

Figure 8:
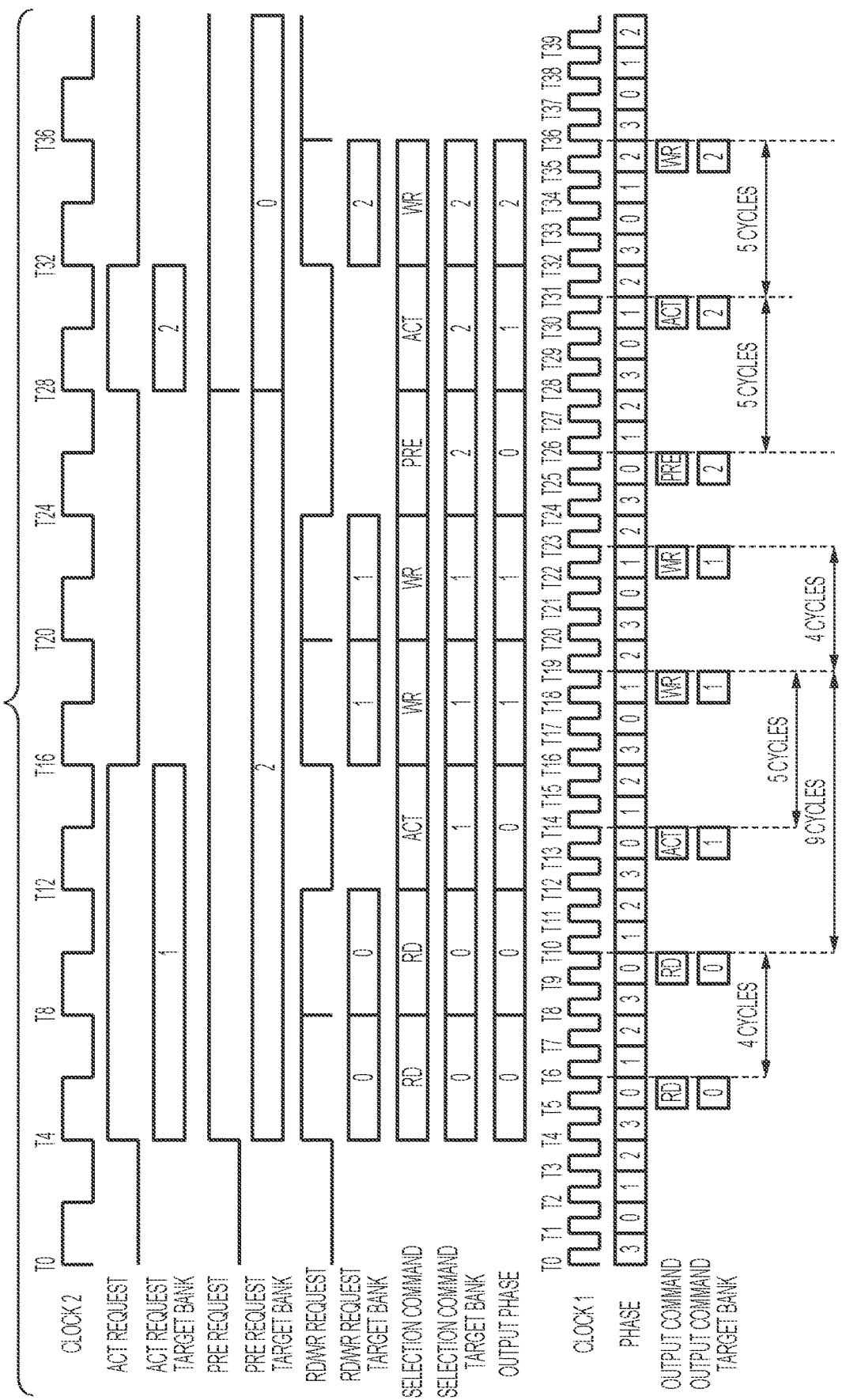
FIG. 8 is a timing diagram showing operations of the memory controller according to a third embodiment.

FIG. 8 is a timing diagram showing operations of the memory controller 101 according to the third embodiment. Although the configuration of the memory controller 101 of the third embodiment is similar to that of the first embodiment, the operating frequency of the clock 1 used by the memory 900 is four times larger than the operating frequency of the clock 2 used by the memory controller 101 as mentioned earlier. Note that the timing constraint between commands is similar to that of the first embodiment (FIG. 3A). Furthermore, the description will be provided under the assumption that the memory accesses held in the holding circuit 201 are also similar to those of the first embodiment (FIG. 3B), and the bank state management circuit 601 also starts operations from the state 621 similarly to the first embodiment (FIG. 3C).

Figure 9A:
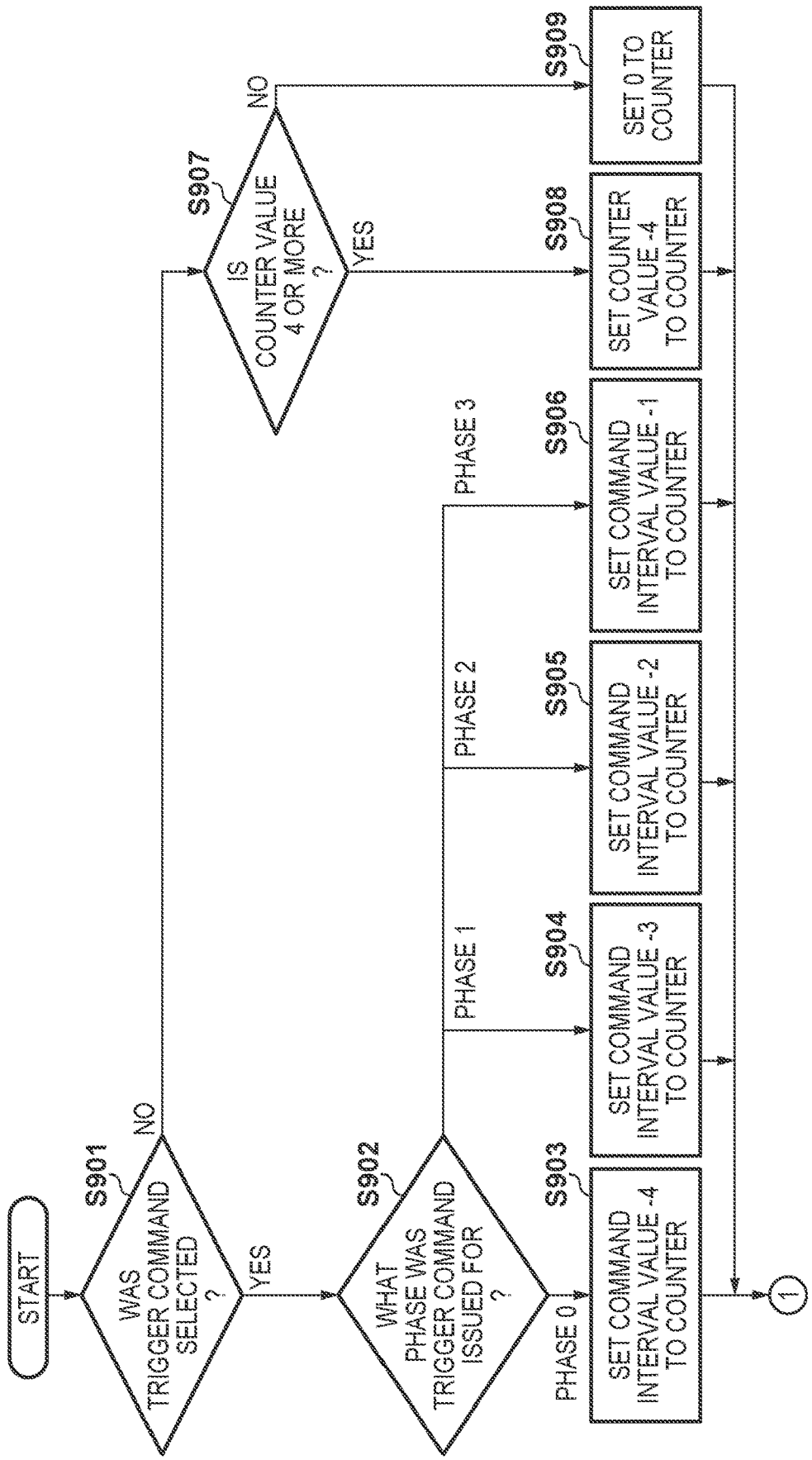
FIG. 9A and FIG. 9B are a flowchart for describing the operations of the determination circuit according to the third embodiment.
Figure 9B:
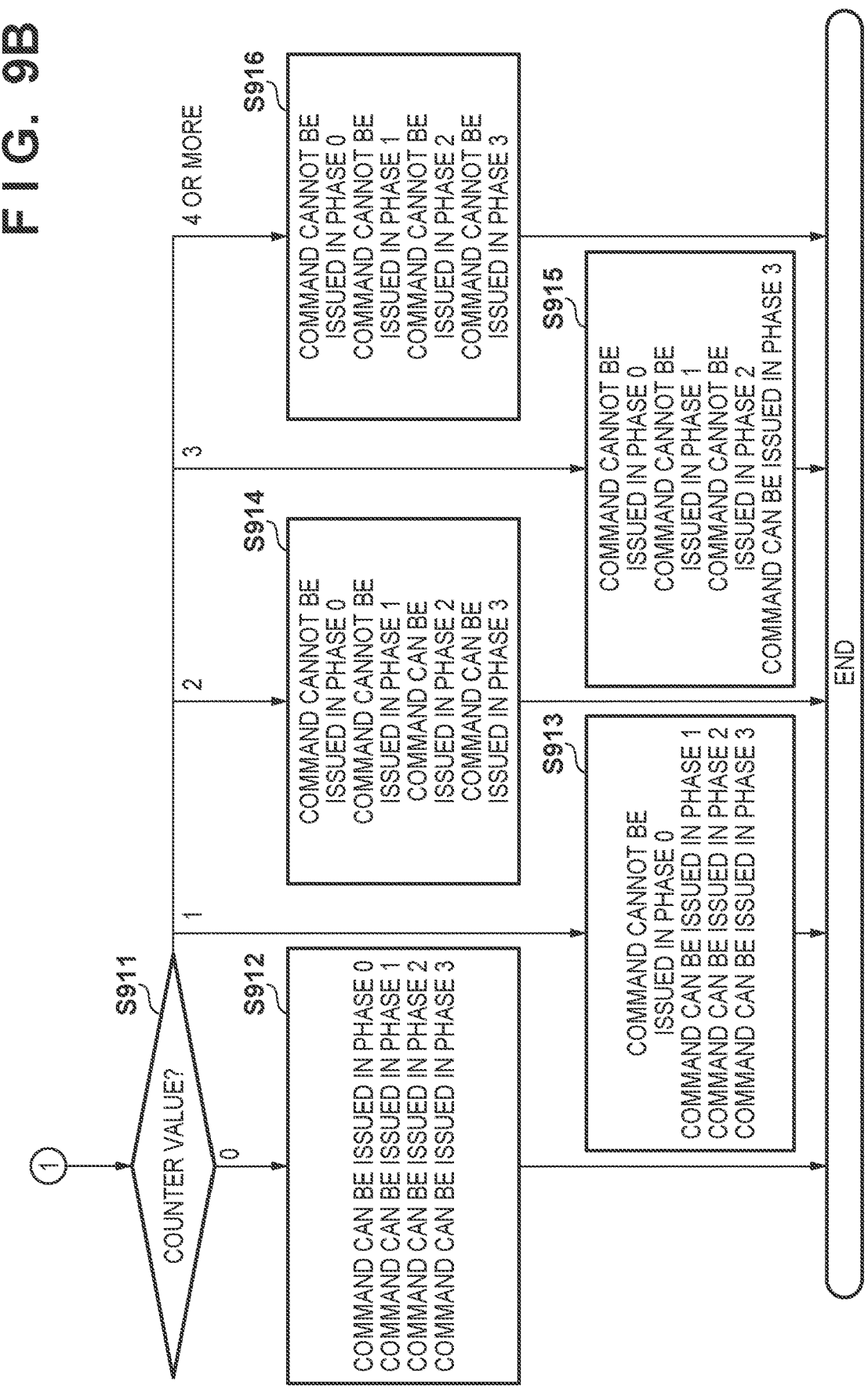

FIG. 9A and FIG. 9B are a flowchart for describing the operations of the determination circuit 701 according to the third embodiment. The determination circuit 701 determines in which phase a command can be issued in accordance with a flow shown in FIG. 9A and FIG. 9B. The following describes the operations of the determination circuit 701, using an example of a selection of an ACT command through to permission of the issuance of a WR command. Note that the processing shown in FIG. 9A and FIG. 9B is executed in synchronization with the clock 2.

First, the determination circuit 701 determines whether an ACT command as a trigger command has been selected (step S901). In a case where it has been determined that an ACT command has been selected (YES in step S901), the determination circuit 701 determines a phase that has been selected for this trigger command (step S902), and causes processing to branch in accordance with the determination result. In each of steps S903 to S906, a value that has been designated in accordance with the determination result is set in the counter. That is to say, in a case where it has been determined that the selected phase is phase 0, the determination circuit 701 sets a value obtained by subtracting 4 from the value of the command interval (in the case of the present example, 5−4=1) in the counter (step S903). Similarly, in a case where it has been determined that the selected phase is phase 1, the determination circuit 701 sets a value obtained by subtracting 3 from the value of the command interval (in the case of the present example, 5−3=2) in the counter (step S904). Also, in a case where it has been determined that the selected phase is phase 2, the determination circuit 701 sets a value obtained by subtracting 2 from the value of the command interval (in the case of the present example, 5−2=3) in the counter (step S905). Furthermore, in a case where it has been determined that the selected phase is phase 3, the determination circuit 701 sets a value obtained by subtracting 1 from the value of the command interval (in the case of the present example, 5−1=4) in the counter (step S906).

In a case where a trigger command has not been issued (NO in step S901), the determination circuit 701 determines whether the counter value is equal to or larger than 4 (step S907). If it has been determined that the counter value is equal to or larger than 4 (YES in step S907), the determination circuit 701 sets a value obtained by subtracting 4 from the counter value in the counter (step S908). On the other hand, if it has been determined that the counter value is smaller than 4 (NO in step S907), the determination circuit 701 sets 0 in the counter (step S909).

Next, the determination circuit 701 checks the counter value and causes processing to branch in accordance with the checked counter value (step S911). If the counter value is 0, the determination circuit 701 determines that the command can be issued in phase 0 to phase 3 (step S912). If the counter value is 1, the determination circuit 701 determines that the command can be issued in phase 1 to phase 3, and cannot be issued in phase 0 (step S913). If the counter value is 2, the determination circuit 701 determines that the command can be issued in phase 2 to phase 3, and cannot be issued in phase 0 to phase 1 (step S914). If the counter value is 3, the determination circuit 701 determines that the command can be issued in phase 3, and cannot be issued in phase 0 to phase 2 (step S915). If the counter value is equal to or larger than 4, the determination circuit 701 determines that the command cannot be issued in phase 0 to phase 3 (cannot be issued in any phase) (step S915).

Figure 10:
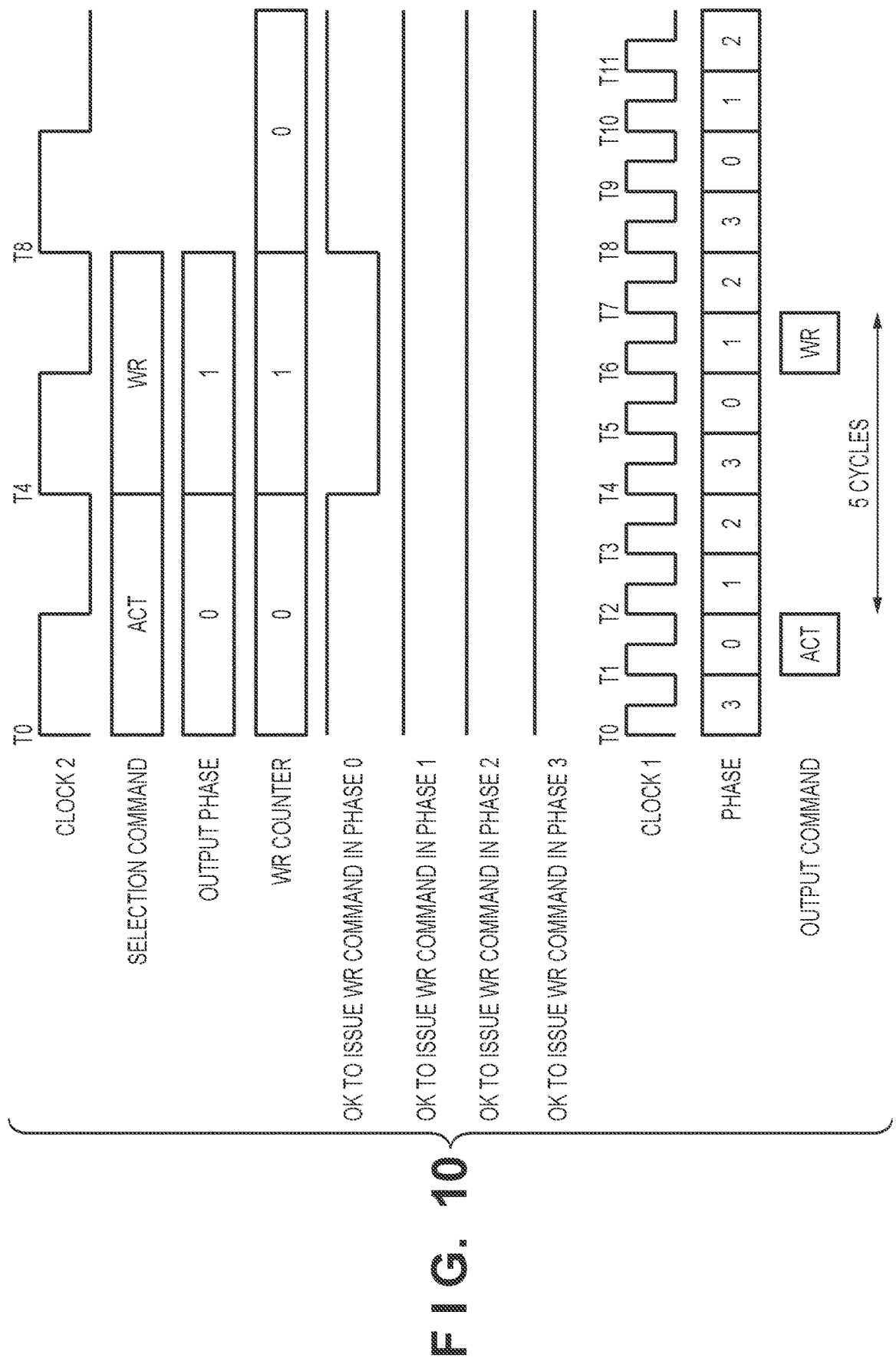
FIG. 10 is a timing diagram showing operations of the determination circuit according to the third embodiment.

FIG. 10 is a timing diagram showing an output timing of the result of determination made by the determination circuit 701 about whether a WR command can be issued in a case where the issuance of ACT command/phase 0 has been selected at T0. When ACT command/phase 0 has been selected at T0, the determination circuit 701 sets 1 in the counter at T4 (step S903). As a result, the determination circuit 701 determines that a WR command cannot be issued in phase 0, but can be issued in phase 1 to phase 3 (step S913). When the selection circuit 401 has selected WR command/phase 1 in response to this determination result, the output circuit 501 outputs a WR command to memory 900 at T6 of the clock 1 (phase 1). Through the foregoing operations, due to the selection of ACT command/phase 0 at T0, an ACT command is issued at T1, and a WR command is issued at T6; thus, the command interval therebetween is five cycles.

Figure 11:
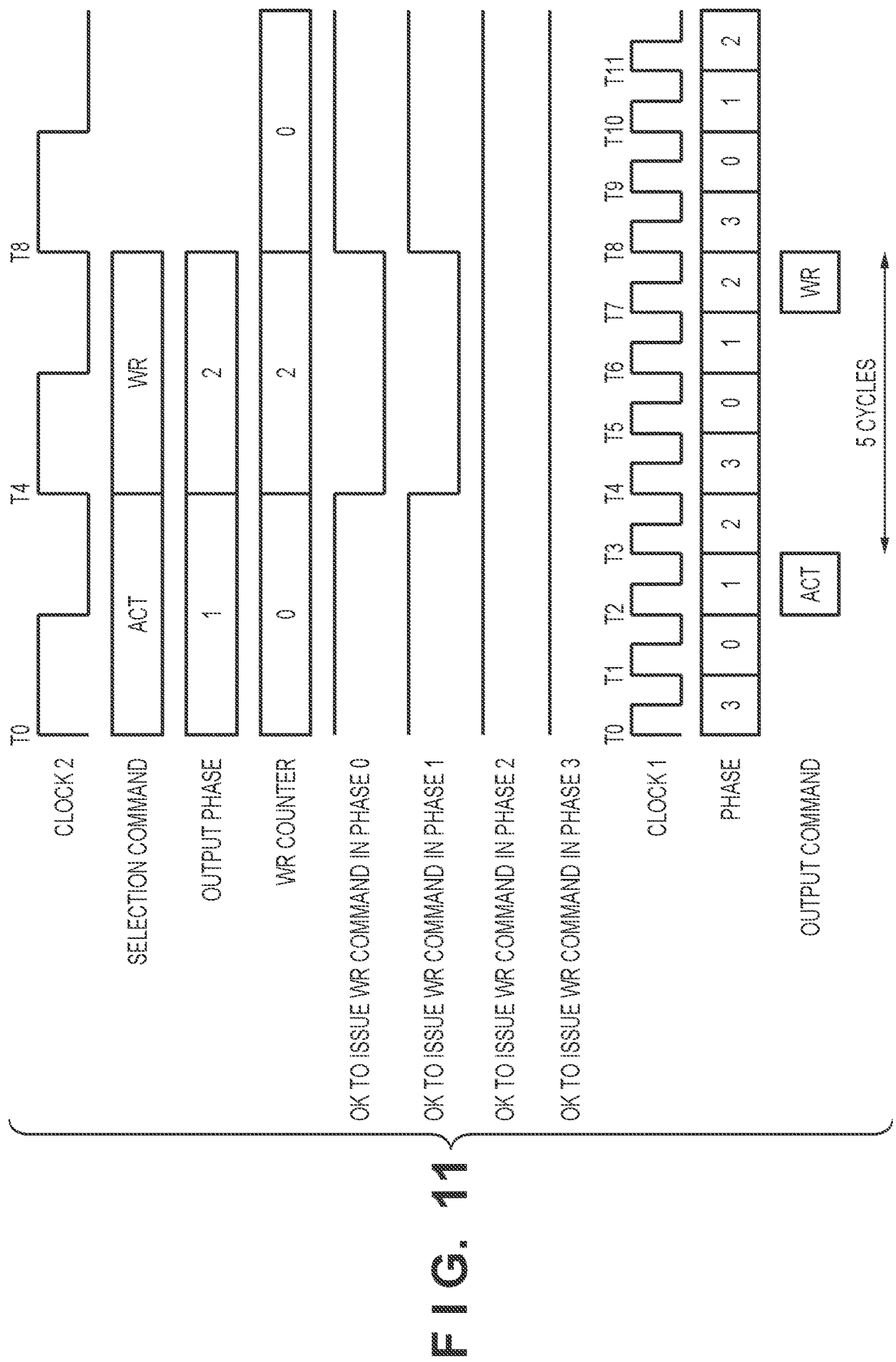
FIG. 11 is a timing diagram showing operations of the determination circuit according to the third embodiment.

FIG. 11 is a timing diagram showing an output timing of the result of determination made by the determination circuit 701 about whether a WR command can be issued in a case where ACT command/phase 1 has been selected at T0. When ACT command/phase 1 has been selected at T0, the determination circuit 701 sets 2 as the counter value at T4 (step S904). Consequently, the determination circuit 701 determines that a WR command cannot be issued in phase 0 to phase 1, and can be issued in phase 2 to phase 3 (step S914). When the selection circuit 401 has selected WR command/phase 2 in response to this determination, the output circuit 501 outputs a WR command at T7 of the clock 1 (phase 2). Through the foregoing operations, due to the selection of ACT command/phase 1 at T0, an ACT command is issued at T2, and a WR command is issued at T7; thus, the command interval therebetween is five cycles.

Figure 12:
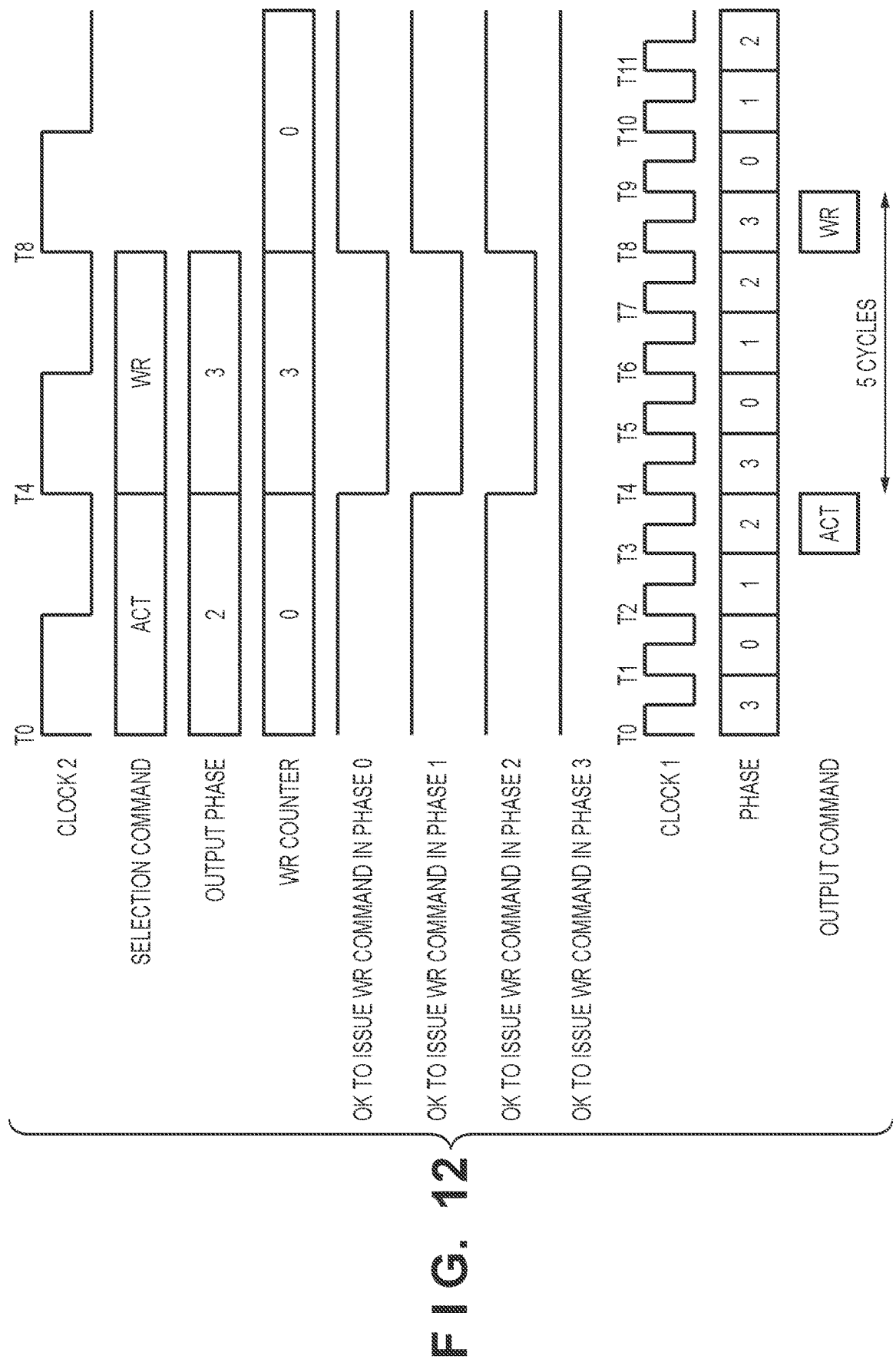
FIG. 12 is a timing diagram showing operations of the determination circuit according to the third embodiment.

FIG. 12 is a timing diagram showing an output timing of the result of determination made by the determination circuit 701 about whether a WR command can be issued in a case where ACT command/phase 2 has been selected at T0. When ACT command/phase 2 has been selected at T0, the determination circuit 701 sets 3 in the counter at T4 (step S905). Consequently, the determination circuit 701 determines that a WR command cannot be issued in phase 0 to phase 2, and can be issued in phase 3 (step S915). When the selection circuit 401 has selected WR command/phase 3 in response to this determination result, the output circuit 501 outputs a WR command at T8 of the clock (phase 2). Through the foregoing operations, due to the selection of ACT command/phase 2 at T0, an ACT command is issued at T3, and a WR command is issued at T8; thus, the command interval therebetween is five cycles.

Figure 13:
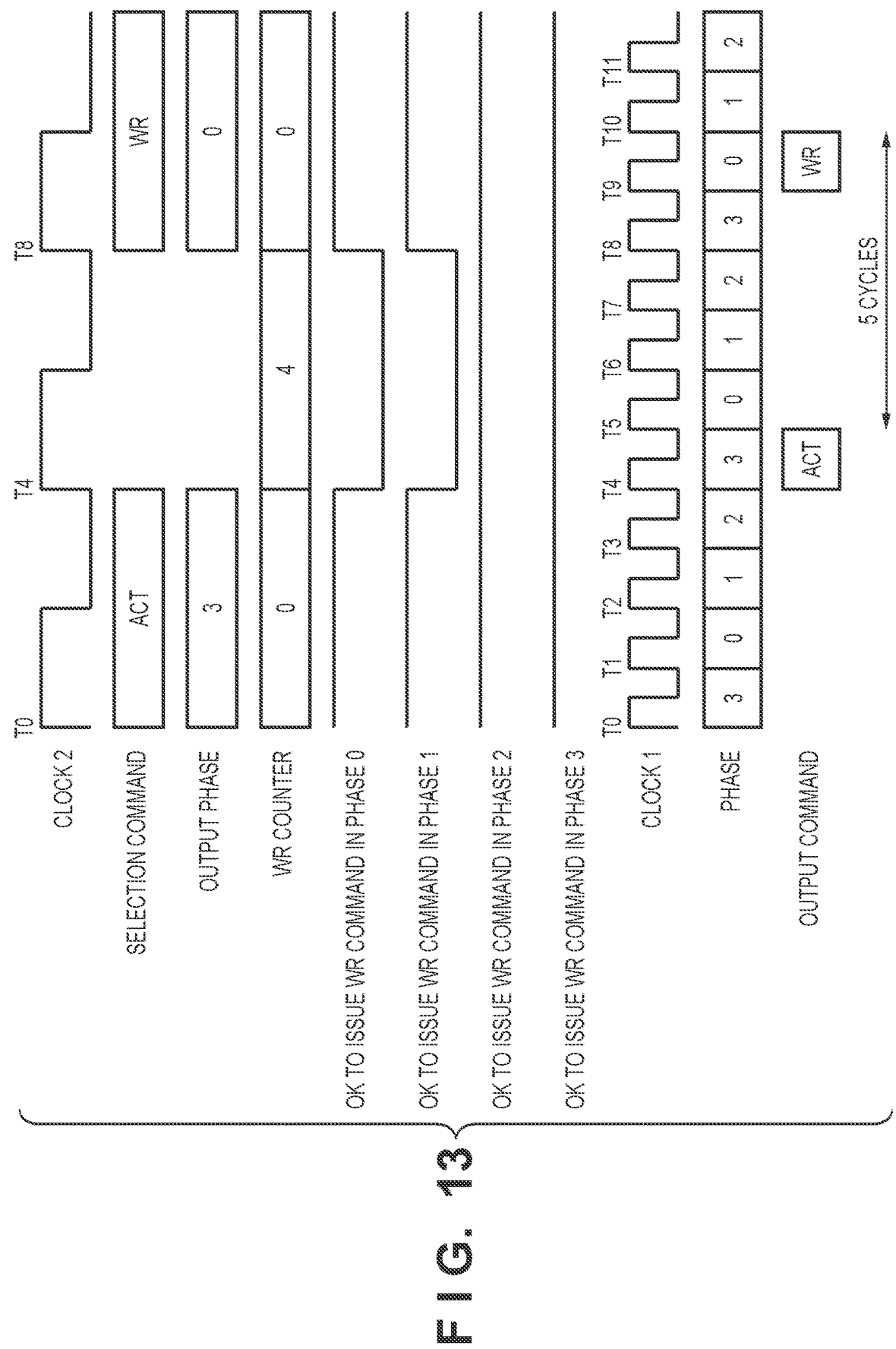
FIG. 13 is a timing diagram showing operations of the determination circuit according to the third embodiment.

FIG. 13 is a timing diagram showing an output timing of the result of determination made by the determination circuit 701 about whether a WR command can be issued in a case where ACT command/phase 3 has been selected at T0. When ACT command/phase 3 has been selected at T0, the determination circuit 701 sets 4 in the counter at T4 (step S905). At this point, the determination circuit 701 determines that a WR command cannot be issued in phase 0 to phase 3. Subsequently, as 0 is set in the counter as a result of subtracting 4 from the counter value at T8 (step S908), the determination circuit 701 determines that a WR command can be issued in phase 0 to phase 3 (step S912). When the selection circuit 401 has selected WR command/phase 0 in response to this determination result at T8, the output circuit 501 outputs a WR command at T9 of the clock 1 (phase 0). Through the foregoing operations, due to the selection of an ACT command (phase 3) at T0, an ACT command is issued at T4, and a WR command is issued at T9; thus, the command interval therebetween is five cycles.

Note, it is assumed that the selection circuit 401 selects, from among the commands that can be issued in one of phase 0 to phase 3, a command in the following order of priority: an RD/WR command, an ACT command, and a PRE command. Furthermore, in a case where it has been determined that the issuance in a plurality of phases is possible with respect to the same command, the selection circuit 401 selects the earliest phase.

Returning to FIG. 8, operations of the memory controller 101 according to the second embodiment will be described. At T4, the ACT request generation circuit 301 asserts an ACT request in order to open bank 1 with respect to the memory access of index 0. The PRE request generation circuit 302 asserts a PRE request in order to close bank 2 with respect to the memory access of index 2. The RD/WR request generation circuit 303 asserts an RD request for the first RD with respect to the memory access of index 1. It is assumed that these three commands are permitted to be issued in phases 0 to 3 at the time of T4. Similarly to the first embodiment, in a case where there are two or more phases (cycles) in which the issuance is possible, the selection circuit 401 adopts a phase that is first in order. Therefore, in accordance with the aforementioned order of priority, the selection circuit 401 selects RD command/phase 0 from among the ACT command, PRE command, and RD command. In response to this selection, the output circuit 501 outputs the RD command to the memory 900 at T5.

At T8, the ACT request generation circuit 301 keeps asserting the ACT request for opening bank 1 with respect to the memory access of index 0. The PRE request generation circuit 302 keeps asserting the PRE request for closing bank 2 with respect to the memory access of index 2. The RD/WR request generation circuit 303 asserts an RD request for the second RD with respect to the memory access of index 1. As RD command/phase 0 was selected at T4, the determination circuit 701 determines that the RD command can be issued in phases 0 to 3 at the time of T8. Therefore, the selection circuit 401 selects the RD command (phase 0) in accordance with the aforementioned order of priority. As a result, the output circuit 501 outputs the (second) RD command to the memory 900 at T9.

At T12, the ACT request generation circuit 301 keeps asserting the ACT request for opening bank 1 with respect to the memory access of index 0. The PRE request generation circuit 302 keeps asserting the PRE request for closing bank 2 with respect to the memory access of index 2. The RD/WR request generation circuit 303 deasserts the RD/WR request as there is no memory access to an open bank. As the commands that have been determined to be issuable at this point are the ACT command (phases 0 to 3) and the PRE command (phases 0 to 3), the selection circuit 401 selects ACT command/phase 0 in accordance with the order of priority. In response to this selection, the output circuit 501 outputs the ACT command to the memory 900 at T13.

At T16, the ACT request generation circuit 301 deasserts the ACT request as there is no memory access for which the ACT command needs to be issued. The PRE request generation circuit 302 keeps asserting the PRE request for closing bank 2 with respect to the memory access of index 2. The RD/WR request generation circuit 303 asserts a WR request for the first WR with respect to the memory access of index 0. As RD command/phase 0 was selected at T8, the determination circuit 701 sets 5 as the counter value at T12 (step S903), and sets 1 as the counter value at T16 (step S908). Therefore, when the WR request has been asserted at T16, the determination circuit 701 permits the issuance of the corresponding WR command in phases 1 to 3 (step S913). Therefore, at this point, the PRE command (phases 0 to 3) and the WR command (phases 1 to 3) have been determined to be issuable. In response to this determination result, the selection circuit 401 selects WR command/phase 1 at T16. Then, in response to this selection, the output circuit 501 outputs the WR command to the memory 900 at T18.

At T20, the PRE request generation circuit 302 keeps asserting the PRE request for closing bank 2 with respect to the memory access of index 2. The RD/WR request generation circuit 303 asserts a WR request for the second WR with respect to the memory access of index 0. As WR command/phase 1 was selected at T16, the counter value becomes 1 at the time of T20 (step S904), and the determination circuit 701 determines that the WR command can be issued in phases 1 to 3. Therefore, the selection circuit 401 selects WR command/phase 1 at T20. Then, the output circuit 501 outputs the WR command to the memory 900 at T22.

At T24, the PRE request generation circuit 302 keeps asserting the PRE request for closing bank 2 with respect to the memory access of index 2. The RD/WR request generation circuit 303 deasserts the RD/WR request as there is no memory access to an open bank. The command that has been determined to be issuable at this point is the PRE command (phases 0 to 3), and the selection circuit 401 selects PRE command/phase 0. In response to this selection, the output circuit 501 outputs the PRE command to the memory 900 at T25.

At T28, the ACT request generation circuit 301 asserts an ACT request in order to open page 0x1 of bank 2 with respect to the memory access of index 2. As the memory access to bank 0 no longer exists, the PRE request generation circuit 302 asserts a PRE request for closing bank 0. PRE command/phase 0 targeting bank 2 was selected at T24, and the cycle interval between the PRE command and the ACT command targeting the same bank is five. Therefore, at the time of T28, the determination circuit 701 determines that the ACT command targeting bank 2 can be issued in phases 1 to 3. Therefore, the PRE command (phases 0 to 3) and the ACT command (phases 1 to 3) have been determined to be issuable at this point, and the selection circuit 401 selects ACT command/phase 1 in accordance with the order of priority. In response to this selection, the output circuit 501 outputs the ACT command to the memory 900 at T30.

At T32, the PRE request generation circuit 302 keeps asserting the PRE request for closing bank 0. The RD/WR request generation circuit 303 asserts a WR request for the second WR with respect to the memory access of index 2. As ACT/phase 1 was selected at T28, the determination circuit 701 determines that the WR command cannot be issued in phases 0 and 1, and can be issued in phases 2 and 3 at T32. The selection circuit 401 selects WR command/2 in accordance with the order of priority, thereby causing the output circuit 501 to output the WR command at T35.

Note that although the selection circuit 401 selects a command in accordance with the order of priority for commands, no limitation is intended by this. For example, a command that has been determined to be issuable for a long period of time (a time greater than a threshold value) may be preferentially selected. Alternatively, for example, a command with an early phase may be preferentially selected. For example, although the selection circuit 401 selects the ACT command at T28 in the foregoing description, it may select the PRE command that has been determined to be issuable in phase 0 in preference to the ACT command that has been determined to be issuable in phase 1. In this case, the selection circuit 401 selects PRE command/phase 0 at T28, and the output circuit 501 outputs the PRE command (bank 0) to the memory 900 at T33. Thereafter, the ACT command is selected at T32.

As described above, the clock 2 used by the memory controller 101 is made slower (have a lower frequency) than the operating clock (clock 1) of the memory 900; consequently, timing convergency can be improved.

Note that the third embodiment has been described under the assumption that the selection circuit 401 issues a command in a phase in which the command can be issued to the memory 900 the earliest out of the information which is generated by the determination circuit 701 and which indicates whether commands can be issued in each phase. However, the selection circuit 401 may issue the command in another phase as long as it is a phase in which the command can be issued out of the information which is generated by the determination circuit 701 and which indicates whether commands can be issued. Furthermore, the selection circuit 401 may also output phases in which the issuance of commands is prohibited.

Fourth Embodiment

Figure 14:
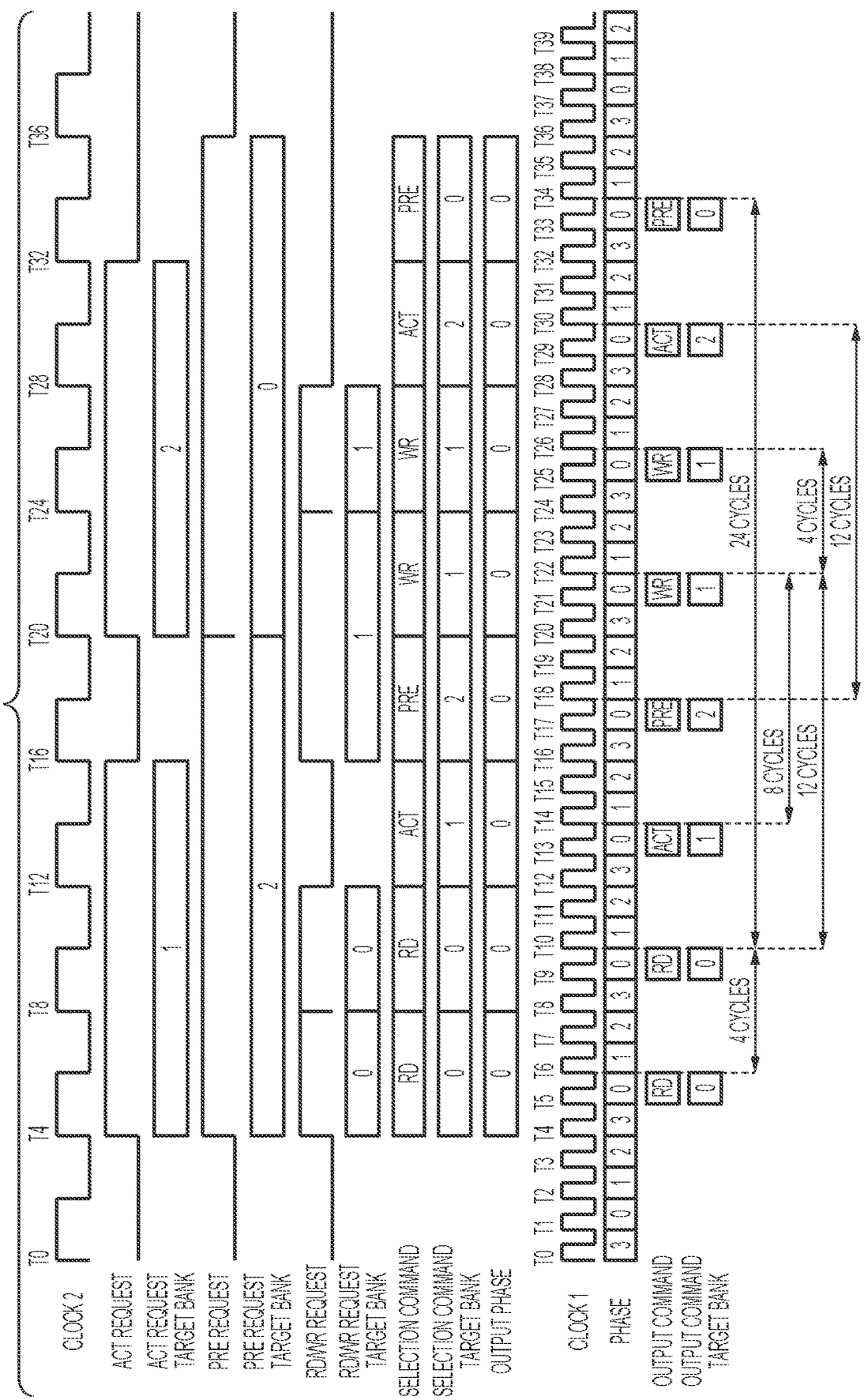
FIG. 14 is a timing diagram showing operations of the memory controller according to a fourth embodiment.

In the third embodiment, phases are determined so that commands can be issued at the shortest command interval while satisfying the cycle constraint. A fourth embodiment will be described in relation to a configuration in which commands are issued to the memory 900 in a predetermined fixed cycle, which is one of the cycles (phases 0 to 3) of the clock 1 that exist within one cycle of the clock 2. FIG. 14 is a timing diagram showing operations of the memory controller 101 according to the fourth embodiment. Although four cycles of the clock 1 exist within one cycle of the clock 2 similarly to the third embodiment, the selection circuit 401 selects a command only in phase 0 according to the fourth embodiment.

For example, at T16, it has been determined that a PRE command (phases 0 to 3) and a WR command (phases 1 to 3) can be issued as described above in the third embodiment (FIG. 8). In the third embodiment, WR command/phase 1 is selected; however, in the fourth embodiment, PRE command/phase 0 is selected as only a command in phase 0 is selected. As described above, the difference from the third embodiment is that the selection circuit 401 selects only a command that has been allowed to be issued in phase 0. This control can be performed, for example, by the selection circuit 401 selecting one command from among the commands that have been permitted by the determination circuit 701 to be issued in phase 0 in accordance with the order of priority. Alternatively, the determination circuit 701 may determine that only commands that have been allowed to be issued in phase 0 are issuable. In this case, for example, it is sufficient to determine that a command is issuable only in a case where the counter value is 0 (step S912), and prohibit the issuance in other cases in the flowchart of FIG. 4.

By thus selecting only a command in phase 0, implementation of the determination circuit 701, selection circuit 401, and output circuit 501 can be further simplified, and timing convergency can be improved. Note that although the fourth embodiment has been described under the assumption that a command is selected only in phase 0, no limitation is intended by this, and it is sufficient to place a restriction on phases. For example, a command may be selected so that the command is issued only in phase 1. Furthermore, a plurality of selectable phases may be used; for example, using two phases among the four phases, a command that can be issued in phase 0 or phase 2 may be selected.

Fifth Embodiment

Figure 15:
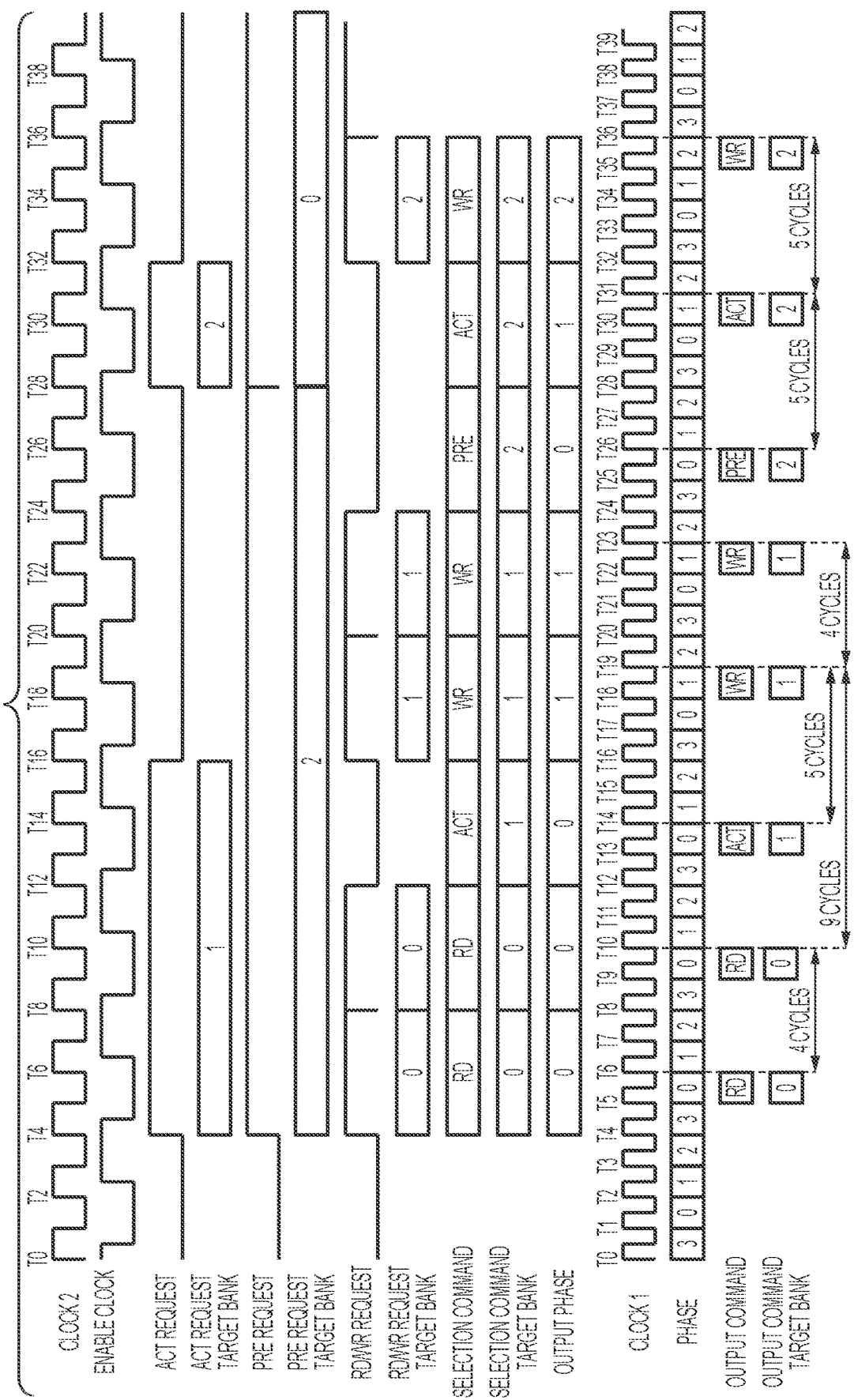
FIG. 15 is a timing diagram showing operations of the memory controller according to a fifth embodiment.

A fifth embodiment will be description in relation to a configuration in which one command is selected in synchronization with the clock 2 during a state where an enable signal, which repeats a valid state and an invalid state at an operating frequency slower than the clock 2, is valid. For example, in the fifth embodiment, it is assumed that the operating cycle of the clock 2 is twice the operating cycle of the clock 1, and the operating cycle of the enable signal is twice the operating cycle of the clock 2. Using this clock enable signal, the ACT request generation circuit 301, PRE request generation circuit 302, RD/WR request generation circuit 303, and selection circuit 401 allow signals to change only in cycles in which the clock enable signal is 1 (in the valid state). In this way, in a case where the timing convergency of a signal is poor, the timing convergency is improved if a signal value has been established over a plurality of clocks of the clock 2. By thus allowing signals to change in synchronization with the clock 2 only in cycles in which the clock enable signal is 1, a multi-cycle path can be realized for which it is sufficient that a signal value be established over a plurality of cycles. FIG. 15 is a timing diagram showing operations of the memory controller 101 according to the fifth embodiment. In the operations, signals generated by the ACT request generation circuit 301, PRE request generation circuit 302, RD/WR request generation circuit 303, and selection circuit 401 change only in cycles in which the clock enable is 1. Here, the clock enable is ¼ of the operating frequency of the clock 1, thereby allowing operations to be performed in accordance with timings similar to those of the third embodiment (FIG. 8). By thus allowing operations to be performed so that a signal value is established over a plurality of clocks, timing convergency can be improved.

Note that although the fifth embodiment has been described using an example in which the ACT request generation circuit 301, PRE request generation circuit 302, RD/WR request generation circuit 303, and selection circuit 401 operate with use of a clock enable signal, no limitation is intended by this. It is permissible to adopt a configuration in which a clock enable signal is used in at least one of the ACT request generation circuit 301, PRE request generation circuit 302, RD/WR request generation circuit 303, selection circuit 401, and the determination circuit 701.

Sixth Embodiment

Figure 16:
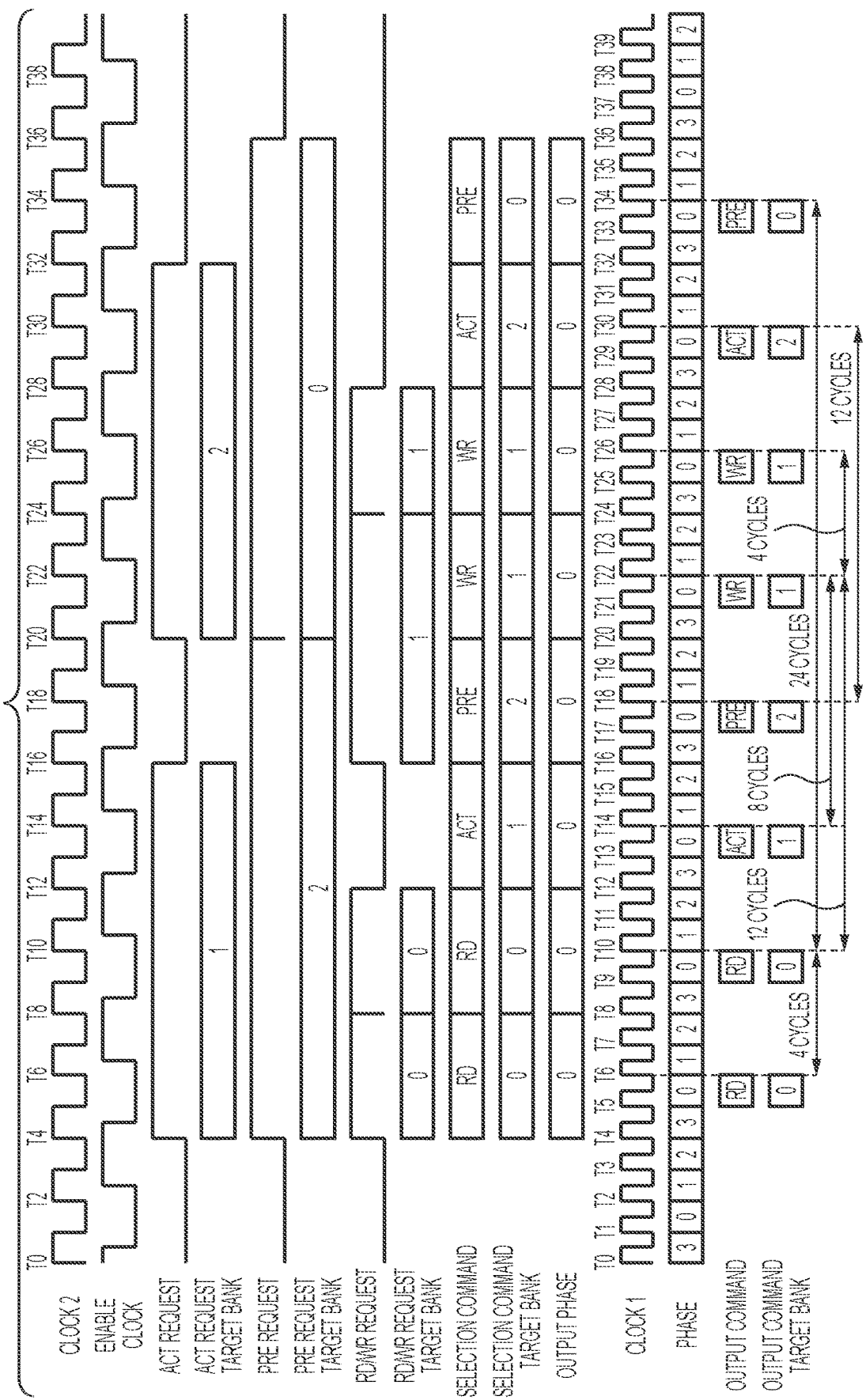
FIG. 16 is a timing diagram showing operations of the memory controller according to a sixth embodiment.

FIG. 16 is a timing diagram showing operations of the memory controller 101 according to a sixth embodiment. The sixth embodiment is realized by the selection circuit 401 selecting a command only in phase 0 in the fifth embodiment. By selecting a command only in phase 0, implementation of the determination circuit 701, selection circuit 401, and output circuit 501 can be further simplified, and timing convergency can be improved. Note that although the sixth embodiment has been described under the assumption that a command is selected only in phase 0, no limitation is intended by this, and it is sufficient to place a restriction on phases. For example, a command may be selected so that the command is issued only in phase 1. Furthermore, a plurality of selectable phases may be used; for example, a command that can be issued in phase 0 or phase 2 may be selected from among the four phases.

Seventh Embodiment

Figure 17:
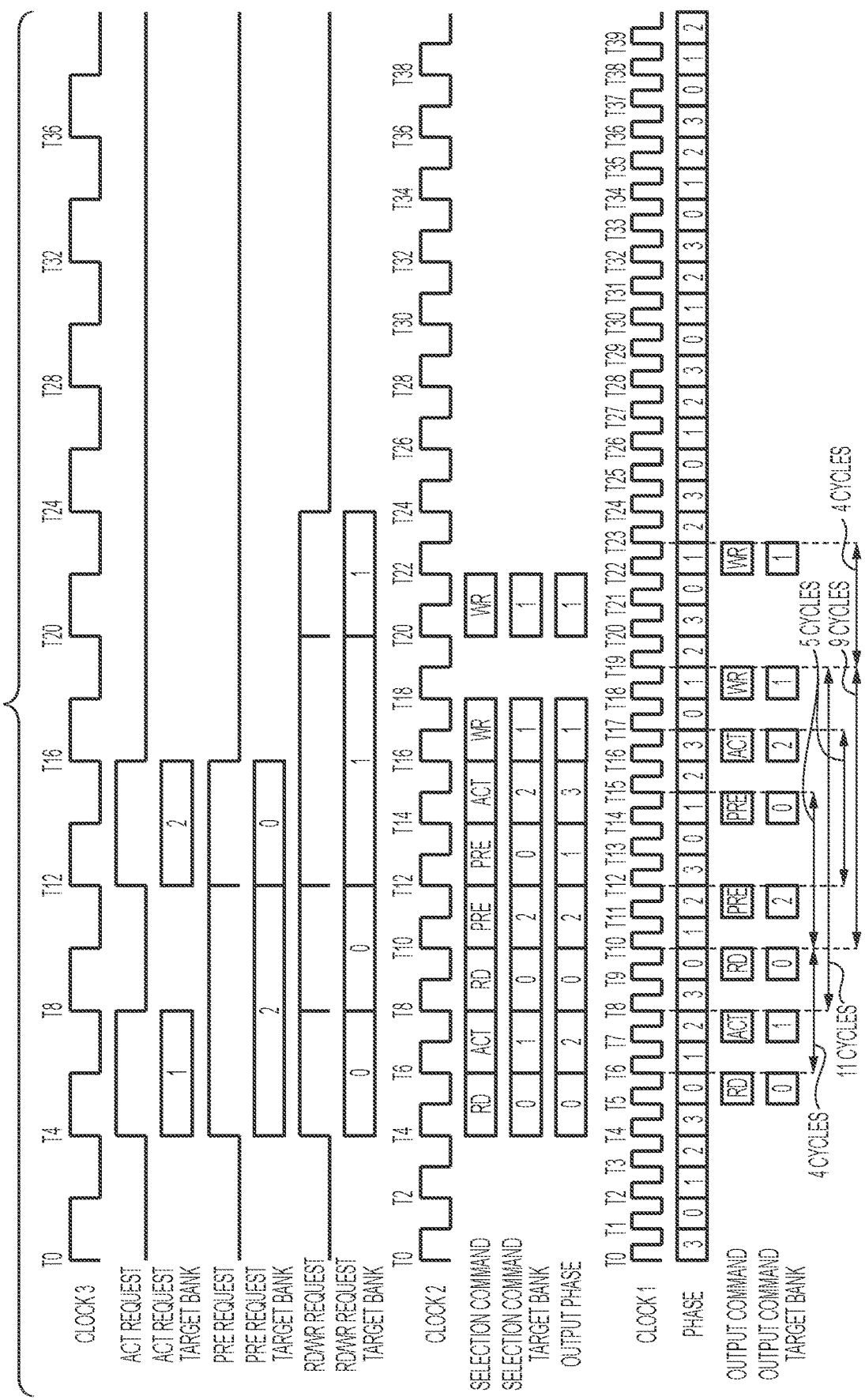
FIG. 17 is a timing diagram showing operations of the memory controller according to a seventh embodiment.

FIG. 17 is a timing diagram showing operations of the memory controller 101 according to a seventh embodiment. In the seventh embodiment, the output circuit 501 operates with the clock 1 that has the operating frequency of the memory, whereas the selection circuit 401 operates with the clock 2 whose operating frequency is half the operating frequency of the clock 1. Also, it is assumed that the ACT request generation circuit 301, PRE request generation circuit 302, and RD/WR request generation circuit 303 further operate with a clock 3 whose operating frequency is half the operating frequency of the clock 2. Note that the timing constraint between commands is similar to that of the first embodiment (FIG. 3A). Furthermore, the description will be provided under the assumption that the memory accesses held in the holding circuit 201 are also similar to those of the first embodiment (FIG. 3B), and the bank state management circuit 601 also starts operations from the state 621 similarly to the first embodiment (FIG. 3C). Note that in a case where the selection circuit 401 has selected a command in a period in which the clock 3 is 1, it does not select the same command in the next cycle so as to prevent duplicate selection of a command request. For example, when the selection circuit 401 has selected a WR command at T20 of FIG. 17, a corresponding WR request is asserted also at T22. The selection circuit 401 needs to avoid re-selection of the WR command corresponding to this WR request.

The operations of the memory controller 101 of the seventh embodiment will be described using FIG. 17. At T4, the ACT request generation circuit 301 asserts an ACT request in order to open bank 1 with respect to the memory access of index 0. The PRE request generation circuit 302 asserts a PRE request in order to close bank 2 with respect to the memory access of index 2. The RD/WR request generation circuit 303 asserts an RD request for the first RD with respect to the memory access of index 1. It is assumed that the determination circuit 701 has determined that the commands corresponding to these requests can be issued in phases 0 to 3 at T4. At T4, in accordance with the order of priority, the selection circuit 401 selects one command from among the commands that have been determined to be issuable in phase 0 or phase 1. Here, RD command/phase 0 is selected. At T5, the output circuit 501 outputs the RD command to the memory 900. At T6, the ACT request generation circuit 301, PRE request generation circuit 302, and RD/WR request generation circuit 303 maintain their respective assert states at T4. Also, the determination circuit 701 maintains the determination result at T4. As the RD command was selected at T4, the selection circuit 401 ignores this RD command. At T6, in accordance with the order of priority, the selection circuit 401 selects one command from among the commands that have been determined to be issuable in phase 2 or phase 3. Here, ACT command/phase 2 is selected. At T7, the output circuit 501 outputs the selected ACT command to the memory 900.

At T8, the ACT request generation circuit 301 deasserts the ACT request as there is no memory access for which the ACT command needs to be issued. The PRE request generation circuit 302 keeps asserting the PRE request for closing bank 2 with respect to the memory access of index 2. The RD/WR request generation circuit 303 asserts an RD request for the second RD with respect to the memory access of index 1. As RD command/phase 0 was selected at T4, the determination circuit 701 determines that an RD command corresponding to the second RD request can be issued in phases 0 to 3 at T8. Also, regarding the PRE command, the state where the PRE command has been determined to be issuable in phases 0 to 3 is maintained. At T8, in accordance with the order of priority, the selection circuit 401 selects one command from among the commands that have been determined to be issuable in phase 0 or phase 1. Here, RD command/phase 0 is selected. At T9, the output circuit 501 outputs the RD command to the memory 900. At T10, the ACT request generation circuit 301, PRE request generation circuit 302, and RD/WR request generation circuit 303 maintain their respective assert states, and the determination circuit 701 maintains the states of determination for the respective commands. As the RD command was selected at T8, the selection circuit 401 ignores this RD command. At T10, in accordance with the order of priority, the selection circuit 401 selects one command from among the commands that have been determined to be issuable in phase 2 or phase 3. Here, PRE command/phase 2 is selected. At T11, the output circuit 501 outputs the PRE command targeting bank 2 to the memory 900.

At T12, the ACT request generation circuit 301 asserts an ACT request in order to open bank 2 with respect to the memory access of index 2. As there is no memory access to bank 0, the PRE request generation circuit 302 asserts a PRE request in order to close bank 0. The RD/WR request generation circuit 303 asserts a WR request for the first WR with respect to the memory access of index 0. As RD command/phase 0 was selected at T8, the determination circuit 701 determines that a WR command cannot be issued. Also, as PRE command/phase 2 targeting bank 2 was selected at T10, the determination circuit 701 determines that an ACT command targeting bank 2 can be issued in phase 3. Furthermore, as RD command/phase 0 targeting bank 0 was selected at T8, the determination circuit 701 determines that a PRE command targeting bank 0 can be issued in phases 1 to 3. The selection circuit 401 selects one of the commands that can be issued in phase 0 or phase 1. Here, PRE command/phase 1 targeting bank 0 is selected. At T14, the output circuit 501 outputs the PRE command to the memory 900.

At T14, the ACT request generation circuit 301, PRE request generation circuit 302, and RD/WR request generation circuit 303 maintain their request assert states at T12. Alternatively, the determination circuit 701 maintains the states of determination for the respective commands. In accordance with the order of priority, the selection circuit 401 selects one command from among the commands that have been determined to be issuable in phase 2 or phase 3. Here, ACT command/phase 3 targeting bank 2 is selected. At T16, the output circuit 501 outputs the ACT command to the memory 900.

At T16, the ACT request generation circuit 301 deasserts the ACT request as there is no memory access for which the ACT command needs to be issued. The PRE request generation circuit 302 deasserts the PRE request as there is no memory access for which the PRE command needs to be issued. The RD/WR request generation circuit 303 keeps asserting the WR request for the first WR with respect to the memory access of index 0. As RD command/phase 0 was selected at T8, the determination circuit 701 determines that a WR command can be issued in phases 1 to 3 at this point. Therefore, at T16, the selection circuit 401 selects WR command/phase 1. In response to this selection, the output circuit 501 outputs the WR command to the memory 900 at T18.

At T18, the ACT request generation circuit 301, PRE request generation circuit 302, and RD/WR request generation circuit 303 maintain their respective assert states. Alternatively, the determination circuit 701 maintains the states of determination for the respective commands. As the WR command was selected at T16, the selection circuit 401 ignores the same at T18. As a result, no command is selected at T18.

At T20, the RD/WR request generation circuit 303 asserts a WR request for the second WR with respect to the memory access of index 0. As WR command/phase 1 was selected at T16, the determination circuit 701 determines that a WR command corresponding to the asserted WR request can be issued in phases 1 to 3. The selection circuit 401 selects WR command/phase 1. At T22, the output circuit 501 outputs the WR command to the memory 900.

As described above, timing convergency can be improved by making the clocks of the holding circuit 201, ACT request generation circuit 301, PRE request generation circuit 302, and RD/WR request generation circuit 303 slow.

Note that the seventh embodiment has been described under the assumption that the selection circuit 401 issues a command in a phase in which the command can be issued to the memory 900 the earliest out of the information which is generated by the determination circuit 701 and which indicates whether commands can be issued in each phase. However, the selection circuit 401 may issue the command in another phase as long as it is a phase in which the command can be issued out of the information which is generated by the determination circuit 701 and which indicates whether commands can be issued in each phase. Furthermore, the determination circuit 701 may also output phases in which the issuance of commands is prohibited.

Eighth Embodiment

Figure 18:
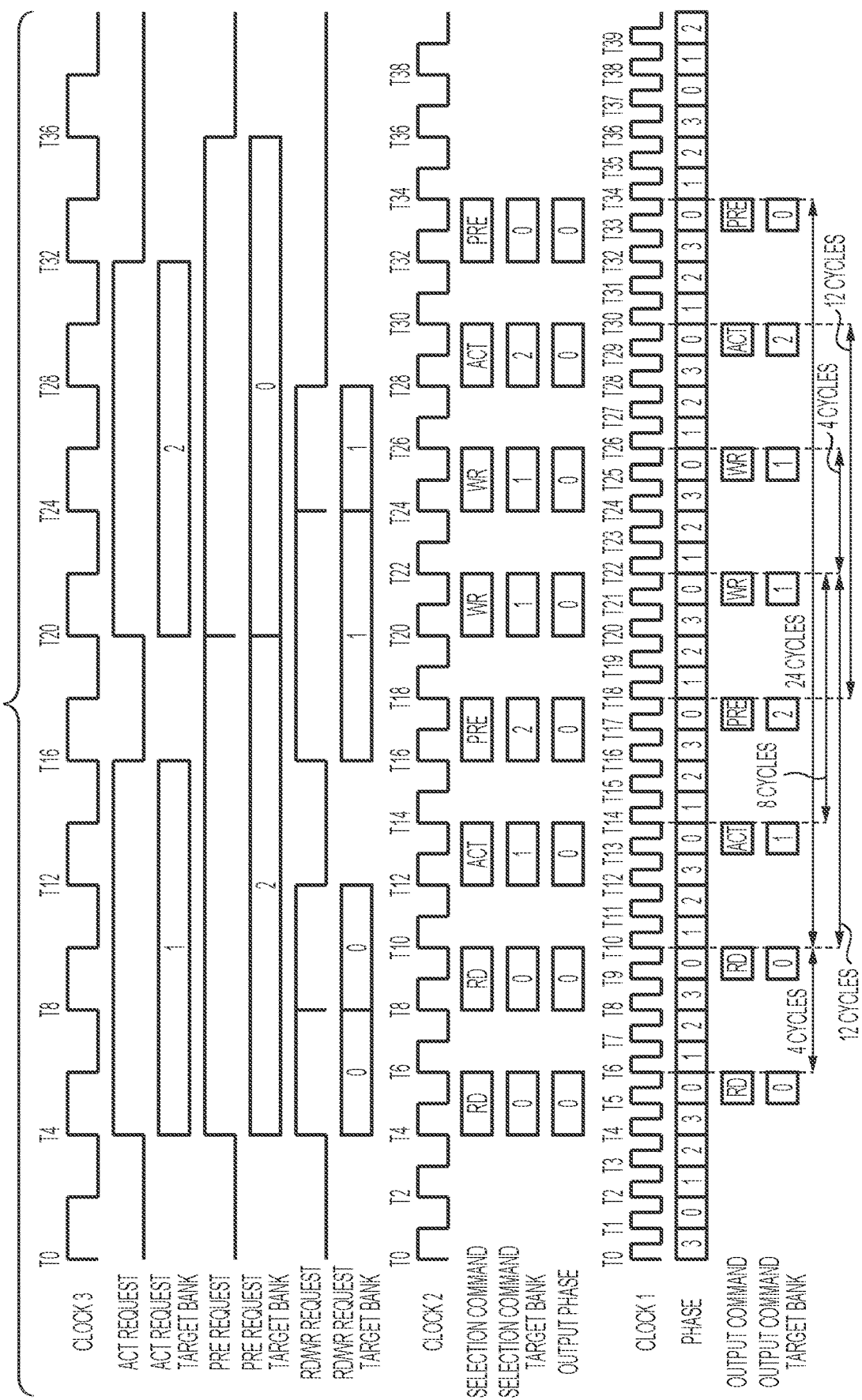
FIG. 18 is a timing diagram showing operations of the memory controller according to an eighth embodiment.

FIG. 18 is a timing diagram showing operations of the memory controller 101 for a case where the selection circuit 401 of the seventh embodiment selects only a command in phase 0. By selecting only a command in phase 0, implementation of the determination circuit 701, selection circuit 401, and output circuit 501 can be further simplified, and timing convergency can be improved as well. Note that although the eighth embodiment has been described under the assumption that only a command in phase 0 is selected, no limitation is intended by this, and it is sufficient to select a command in a predetermined limited phase(s). For example, only a command in phase 0 and a command in phase 2 may be selected. Furthermore, regarding the selection of a command in the predetermined phase, the determination circuit 701 may determine only commands that can be issued in the predetermined phase, or the selection circuit 401 may select a command to be issued from among the commands that can be issued in the predetermined phase.

Ninth Embodiment

FIG. 19 is a block diagram showing a configuration of a memory controller 101a according to a ninth embodiment. In the memory controller 101a, the ACT request generation circuit 301 and the PRE request generation circuit 302 of the first embodiment are replaced with an ACT/PRE request generation circuit 321. The ACT/PRE request generation circuit 321 generates a command request for one of an ACT command and a PRE command from the memory accesses in the holding circuit 201. Any method may be used as a method of selecting which one of the ACT command and the PRE command is to be generated. For example, the ACT/ PRE request generation circuit 321 preferentially selects an ACT or PRE command corresponding to a memory access that has been held for the longest period of time among the memory accesses which are held in the holding circuit 201 and for which an ACT or PRE command can be issued. As another method, one of an ACT command and a PRE command may be preferentially selected on a constant basis.

The configurations of the request generation circuits may be different in the above-described manner.

As described above, the present disclosure relates to a scheduling technique for making the effective band of the memory 900 efficient. According to each embodiment, an arbiter in a preceding stage conducts an arbitration for each memory command, an arbiter in a succeeding stage conducts an arbitration among memory commands, and the operating frequency of each arbiter is made selectable; in this way, a design change is not necessary even if the operating frequency of the memory increases.

As described above, according to each of the aforementioned embodiments, a memory controller is provided that is robust against at least one of an increase in the number of masters, an increase in the number of banks, and an increase in the operating frequency of the memory.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-031315, filed Mar. 1, 2023 which is hereby incorporated by reference herein in its entirety.

What is claimed is:

1. A memory controller, comprising:
one or more circuits, the one or more circuits being configured to cause the memory controller to perform operations comprising:
holding a plurality of memory accesses to a memory that operates with a first clock;
generating a plurality of command requests for causing the memory to operate based on the plurality of memory accesses;
determining whether a plurality of commands corresponding to the plurality of command requests are issuable, based on necessary intervals between issuances of commands, wherein the necessary intervals are respectively set for the plurality of commands;
selecting one command to be issued to the memory from among commands that have been determined to be issuable; and
outputting the selected one command to the memory, wherein the memory controller performs the determining and the selecting operations with a second clock having a lower frequency than the first clock, and the memory controller performs the outputting operation with the first clock.

2. The memory controller according to claim 1, wherein the determining adds phase information to commands that have been determined to be issuable, the phase information indicating a cycle in which the command is issuable among a plurality of cycles of the first clock that exist within one cycle of the second clock, and the outputting outputs the selected one command in the cycle indicated by the phase information added to the selected one command.

3. The memory controller according to claim 2, wherein in a case where the phase information of the selected one command indicates that the selected one command is issuable in two or more cycles, the selecting adds, to the selected one command, phase information indicating the cycle that is first in order.

4. The memory controller according to claim 2, wherein the selecting selects one command from among commands that have been permitted to be issued in a predetermined cycle according to the phase information.

5. The memory controller according to claim 1, wherein the determining determines whether the plurality of commands are issuable in a predetermined cycle among a plurality of cycles of the first clock that exist within one cycle of the second clock.

6. The memory controller according to claim 2, wherein in a case where an operating frequency of the first clock is N times an operating frequency of the second clock, where N is a natural number, the phase information indicates a cycle in which outputting of the command is permitted or prohibited among $0^{th}$ to $(N-1)^{th}$ cycles of the first clock that exist within one cycle of the second clock.

7. The memory controller according to claim 6, wherein the N is 2 or 4.

8. The memory controller according to claim 1, wherein the memory controller performs at least one of the generating, the determining, and the selecting operations with the second clock during a period in which an enable signal is valid, the enable signal repeating a valid state and an invalid state at an operating frequency slower than an operating frequency of the second clock.

9. The memory controller according to claim 1, wherein the memory controller performs the generating the plurality of command requests with the second clock.

10. The memory controller according to claim 1, wherein the memory controller performs the generating the plurality of command requests with a third clock that is having a lower frequency than the second clock.

11. The memory controller according to claim 1, wherein types of commands, of the plurality of commands, include activate, precharge, read, and write.

12. The memory controller according to claim 1, wherein in a case where there are a plurality of commands that have been determined to be issuable, the selecting unit selects one command in accordance with an order of priority that has been preset for command types.

13. The memory controller according to claim 12, wherein
the order of priority is read, write, activate, and precharge, or is write, read, activate, and precharge.

14. The memory controller according to claim 12, wherein
the selecting preferentially selects a command that has been determined to be issuable for a period of time greater than a threshold value.

15. The memory controller according to claim 1, wherein
the generating preferentially generates a command request corresponding to a memory access that has been held in the holding for a period of time greater than a threshold value.

16. A control method for a memory controller including one or more circuits, the one or more circuits being configured to cause the memory controller to hold a plurality of memory accesses to a memory that operates with a first clock, the control method comprising:
generating a plurality of command requests for causing the memory to operate based on the plurality of memory accesses;
determining whether a plurality of commands corresponding to the plurality of command requests are issuable, based on necessary intervals between issuances of commands, wherein the necessary intervals are respectively set for the plurality of commands;
selecting one command to be issued to the memory from among commands that have been determined to be issuable; and
outputting the selected one command to the memory, wherein the determining and the selecting are operations performed with a second clock having a lower frequency than the first clock, and the outputting is an operation performed with the first clock.

* * * * *